US011176473B2

(12) United States Patent
Koseki et al.

(10) Patent No.: US 11,176,473 B2
(45) Date of Patent: Nov. 16, 2021

(54) PARTIALLY OBSERVED MARKOV DECISION PROCESS MODEL AND ITS USE

(71) Applicant: INTERNATIONAL BUSINESS MACHINES CORPORATION, Armonk, NY (US)

(72) Inventors: Akira Koseki, Tokyo (JP); Tetsuro Morimura, Tokyo (JP); Toshiro Takase, Tokyo (JP); Hiroki Yanagisawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 15/400,069

(22) Filed: Jan. 6, 2017

(65) Prior Publication Data

US 2018/0197096 A1 Jul. 12, 2018

(51) Int. Cl.
*G06N 7/00* (2006.01)
*G06N 3/00* (2006.01)
*G06N 20/00* (2019.01)

(52) U.S. Cl.
CPC ............. *G06N 7/005* (2013.01); *G06N 3/006* (2013.01); *G06N 20/00* (2019.01)

(58) Field of Classification Search
CPC ......... G06N 7/005; G06N 20/00; G06N 3/006
See application file for complete search history.

(56) References Cited

U.S. PATENT DOCUMENTS

| 6,931,384 | B1 | 8/2005 | Horvitz et al. | |
|---|---|---|---|---|
| 8,458,715 | B1 * | 6/2013 | Khosla | G06F 9/50 718/104 |
| 8,676,583 | B2 * | 3/2014 | Gupta | G10L 15/22 704/256 |

(Continued)

FOREIGN PATENT DOCUMENTS

| JP | 2012190062 | * 10/2012 | ............. G05B 13/02 |
|---|---|---|---|
| JP | 2012190062 A | 10/2012 | |

OTHER PUBLICATIONS

Jason D. Williams, Markov Decision Processes for Spoken Dialogue Management, Apr. 2006, 138 pages (Year: 2006).*

(Continued)

*Primary Examiner* — Alexey Shmatov
*Assistant Examiner* — Tri T Nguyen
(74) *Attorney, Agent, or Firm* — Tutunjian & Bitetto, P.C.; Randall Bluestone

(57) ABSTRACT

A method for selecting an action, includes reading, into a memory, a Partially Observed Markov Decision Process (POMDP) model, the POMDP model having top-k action IDs for each belief state, the top-k action IDs maximizing expected long-term cumulative rewards in each time-step, and k being an integer of two or more, in the execution-time process of the POMDP model, detecting a situation where an action identified by the best action ID among the top-k action IDs for a current belief state is unable to be selected due to a constraint, and selecting and executing an action identified by the second best action ID among the top-k (Continued)

action IDs for the current belief state in response to a detection of the situation. The top-k action IDs may be top-k alpha vectors, each of the top-k alpha vectors having an associated action, or identifiers of top-k actions associated with alpha vectors.

12 Claims, 16 Drawing Sheets

(56) References Cited

U.S. PATENT DOCUMENTS

| | | | | |
|---|---|---|---|---|
| 9,747,616 | B2* | 8/2017 | Osogami | G06F 17/10 |
| 10,083,213 | B1* | 9/2018 | Podgorny | G06F 16/3329 |
| 2010/0262286 | A1* | 10/2010 | Eidenberger | G06N 20/00 |
| | | | | 700/246 |
| 2011/0010164 | A1 | 1/2011 | Williams | |
| 2011/0016067 | A1* | 1/2011 | Levchuk | G06N 7/005 |
| | | | | 706/12 |
| 2011/0214006 | A1* | 9/2011 | Meek | G06F 11/079 |
| | | | | 714/2 |
| 2011/0282801 | A1* | 11/2011 | Marecki | G06Q 40/06 |
| | | | | 705/36 R |
| 2012/0072259 | A1* | 3/2012 | Morimura | G06Q 10/0635 |
| | | | | 705/7.28 |
| 2012/0310961 | A1 | 12/2012 | Callison et al. | |
| 2013/0185039 | A1* | 7/2013 | Tesauro | G06Q 10/063 |
| | | | | 703/6 |
| 2014/0330554 | A1* | 11/2014 | Williams | G06F 40/56 |
| | | | | 704/9 |
| 2014/0358437 | A1* | 12/2014 | Fletcher | G01C 21/3617 |
| | | | | 701/533 |
| 2015/0262231 | A1 | 9/2015 | Osogami | |
| 2018/0012137 | A1 | 1/2018 | Wright et al. | |

OTHER PUBLICATIONS

Ji et al., Point-Based Policy Iteration, 2007, 7 pages (Year: 2007).*

Kurniawati et al., "SARSOP: Efficient Point-Based POMDP Planning by Approximating Optimally Reachable Belief Spaces", In Proc Robotics: Science & Systems. Jun. 2008. pp. 1-8.

Williams et al, "Partially Observable Markov Decision Processes for Spoken Dialog Systems", Computer Speech and Language. vol. 21. Apr. 2007. pp. 393-422.

U.S. Office Action issued in U.S. Appl. No. 15/804,549, dated Aug. 22, 2019, pp. 1-42.

U.S. Final Office Action issued in U.S. Appl. No. 15/804,549, dated Mar. 4, 2020, pp. 1-24.

U.S. Final Office Action issued in U.S. Appl. No. 15/804,549, dated Nov. 12, 2020, pp. 1-29.

* cited by examiner

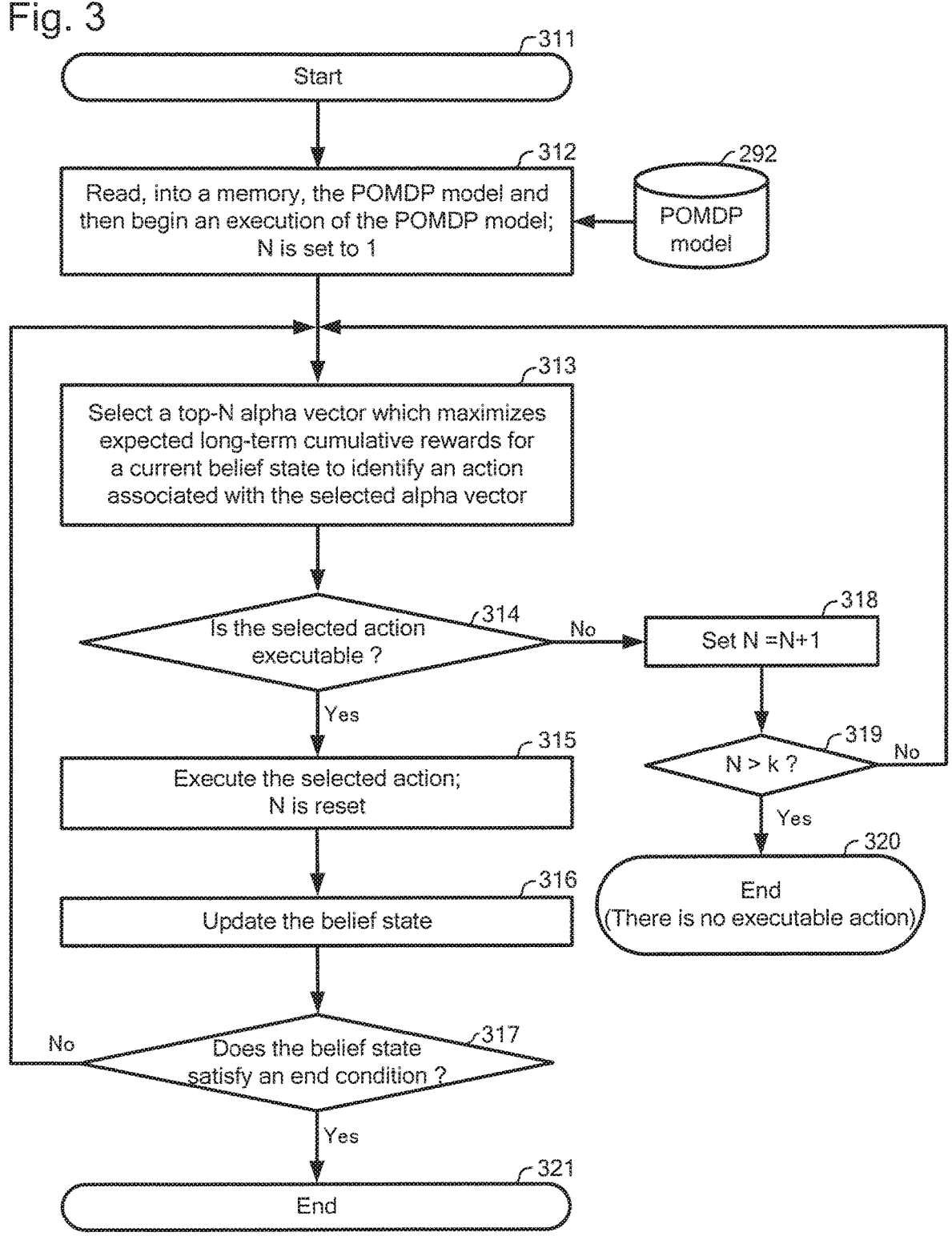

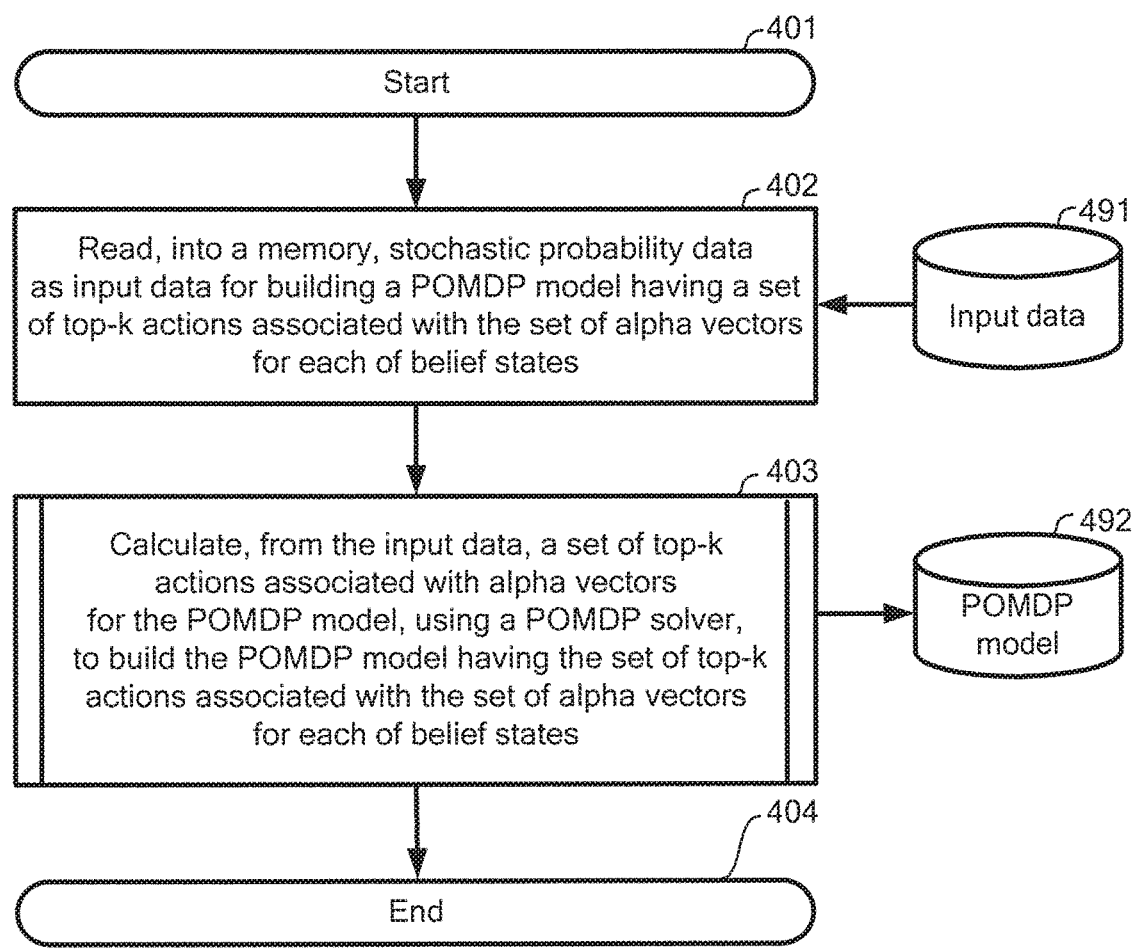

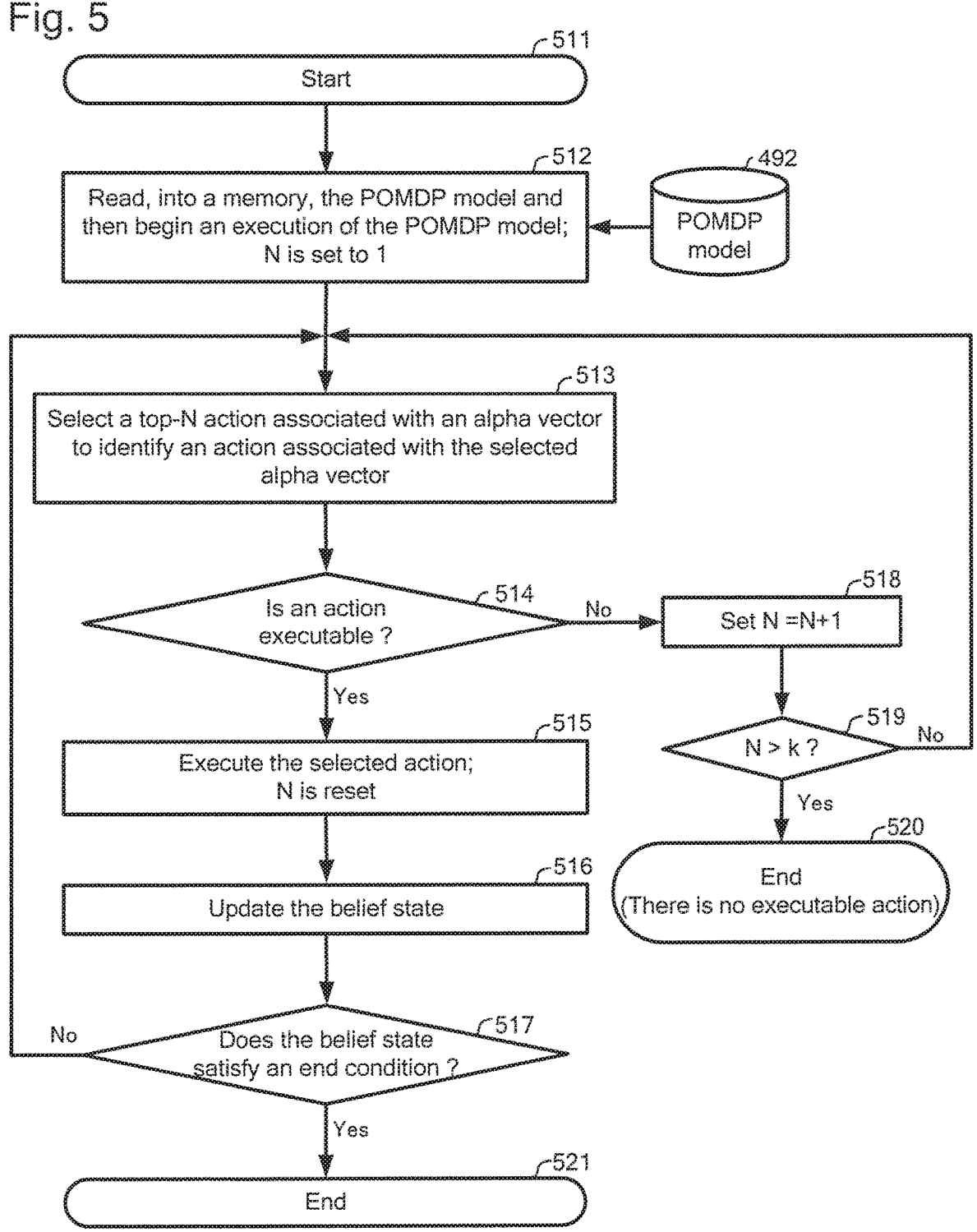

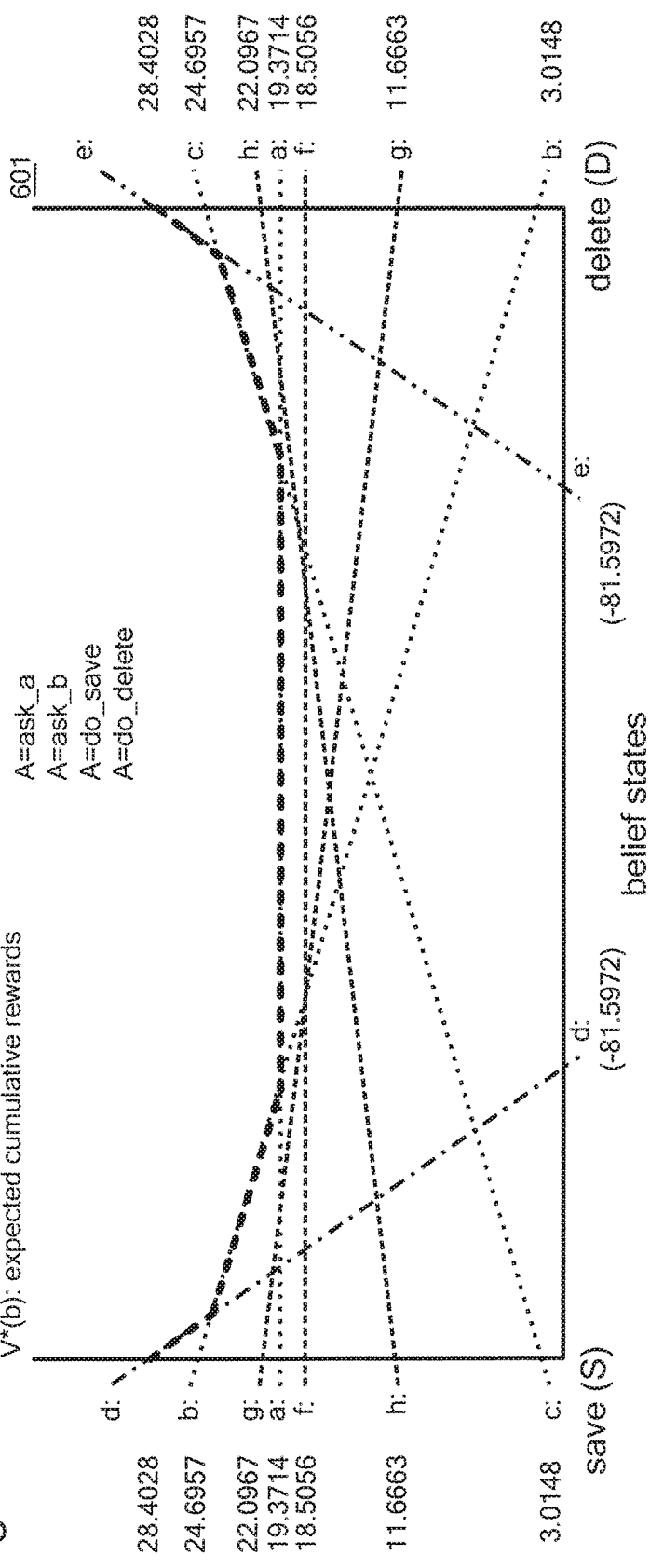

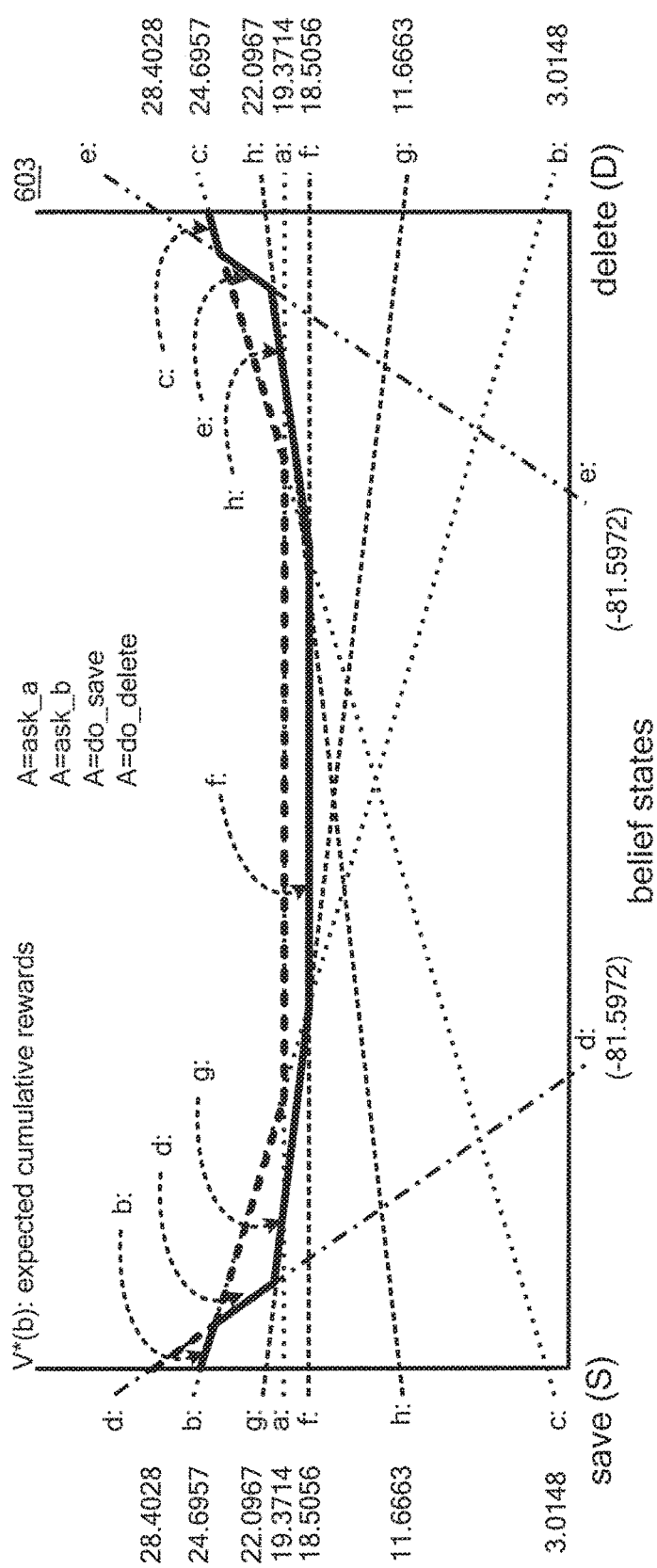

Fig. 8

- Input to the POMDP solver: {$S, A, T, R, O, Z$}
- States: $S = \{save, delete\}$
- Actions: $A = \{ask\_a, ask\_b, do\_save, do\_delete\}$
- Transition function: $T(s, a, s') = Pr(s' | S, a)$

801

| s' \ (s,a) | (save, ask_a) | (save, ask_b) | (save, do_save) | (save, do_delete) | (delete, ask_a) | (delete, ask_b) | (delete, do_save) | (delete, do_delete) |
|---|---|---|---|---|---|---|---|---|
| save | 1 | 1 | 0.5 | 0.5 | 0 | 0 | 0.5 | 0.5 |
| delete | 0 | 0 | 0.5 | 0.5 | 1 | 1 | 0.5 | 0.5 |

- Reward function: $R(s, a)$

802

| R \ (s',a) | (save, ask_a) | (save, ask_b) | (save, do_save) | (save, do_delete) | (delete, ask_a) | (delete, ask_b) | (delete, do_save) | (delete, do_delete) |
|---|---|---|---|---|---|---|---|---|
| r | -1 | -1 | 10 | -100 | -1 | -1 | -100 | 10 |

- Observations: $O = \{O\_save, O\_delete\}$
- Observation function: $Z(s', A, O) = Pr(o' | s', a)$

803

| o' \ (s',a) | (save, ask_a) | (save, ask_b) | (save, do_save) | (save, do_delete) | (delete, ask_a) | (delete, ask_b) | (delete, do_save) | (delete, do_delete) |
|---|---|---|---|---|---|---|---|---|
| O_save | 0.85 | 0.8 | 0.5 | 0.5 | 0.15 | 0.2 | 0.5 | 0.5 |
| O_delete | 0.15 | 0.2 | 0.5 | 0.5 | 0.85 | 0.8 | 0.5 | 0.5 |

- Discount factor: $\lambda = 0.95$
- Initial belief state: $b_0 = (Pr(save), Pr(delete)) = (0.5, 0.5)$
- Horizontal length: $l = \infty$

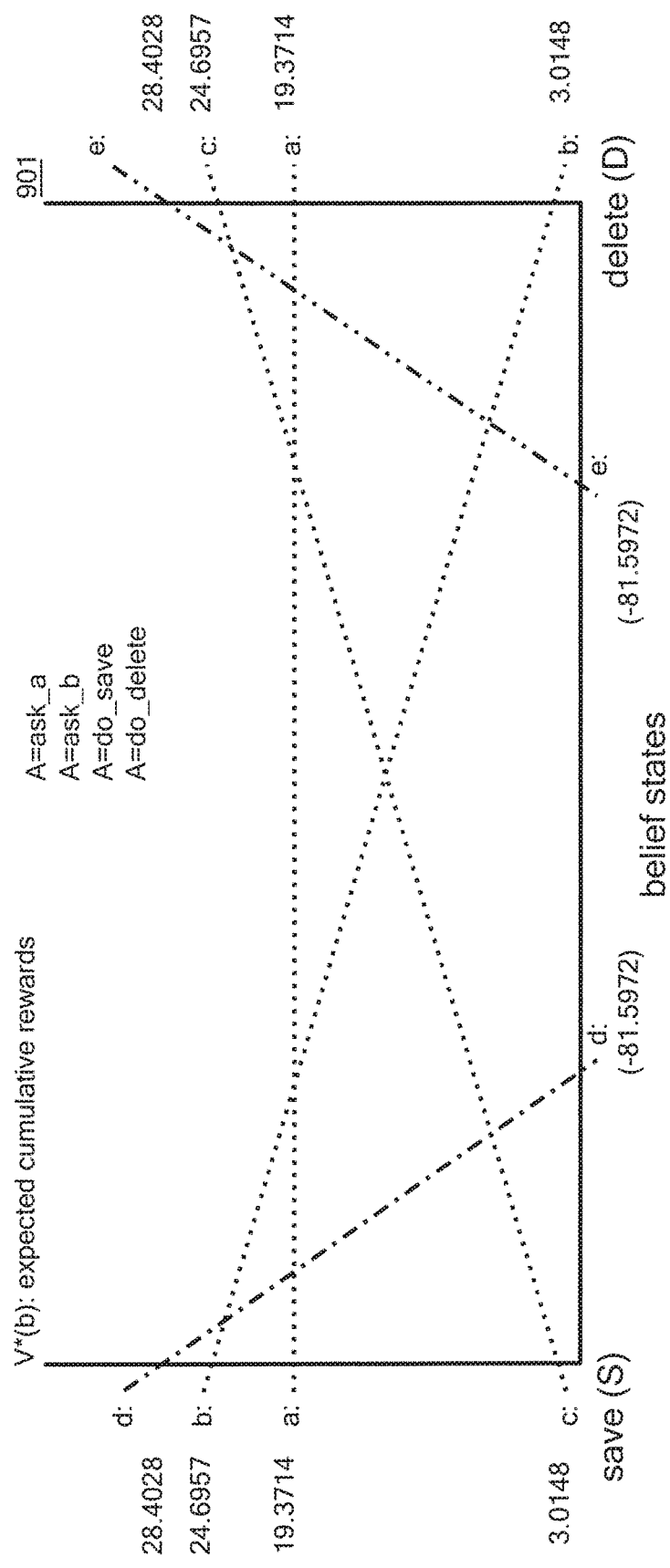

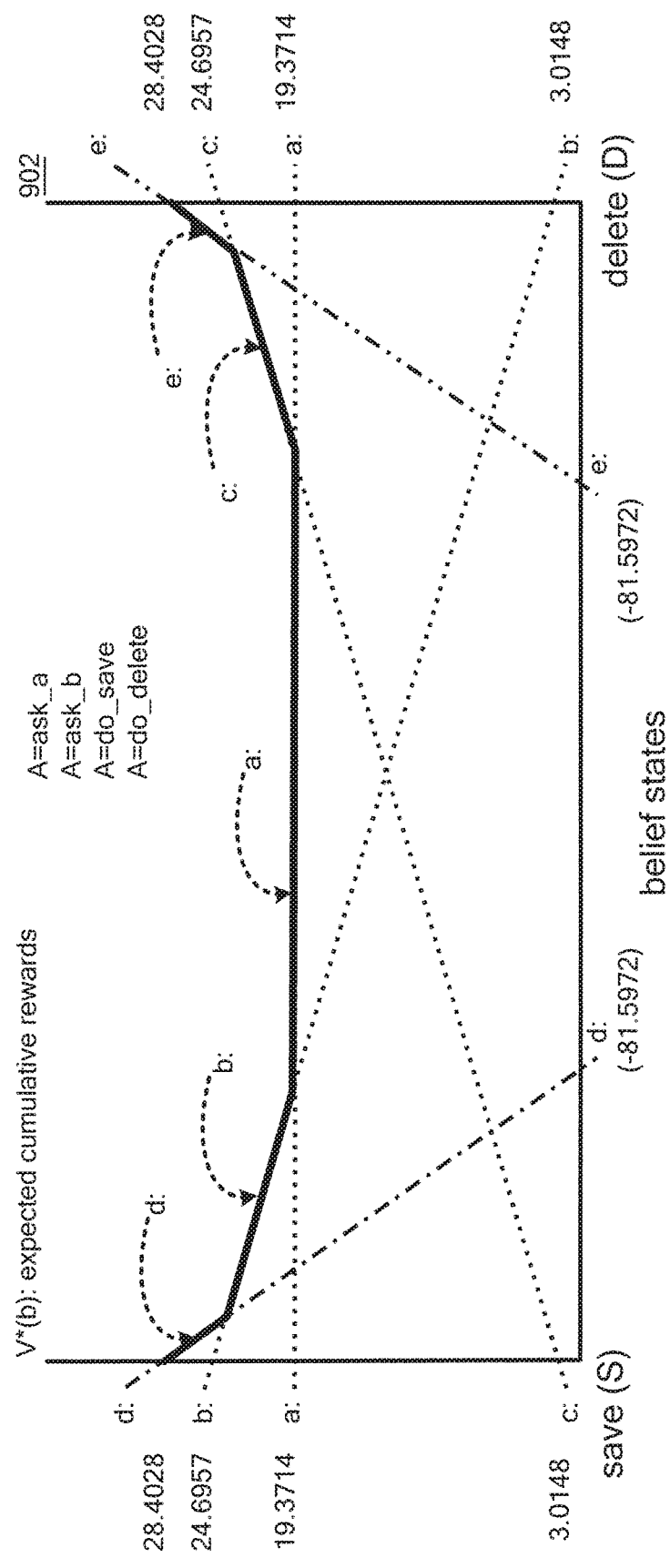

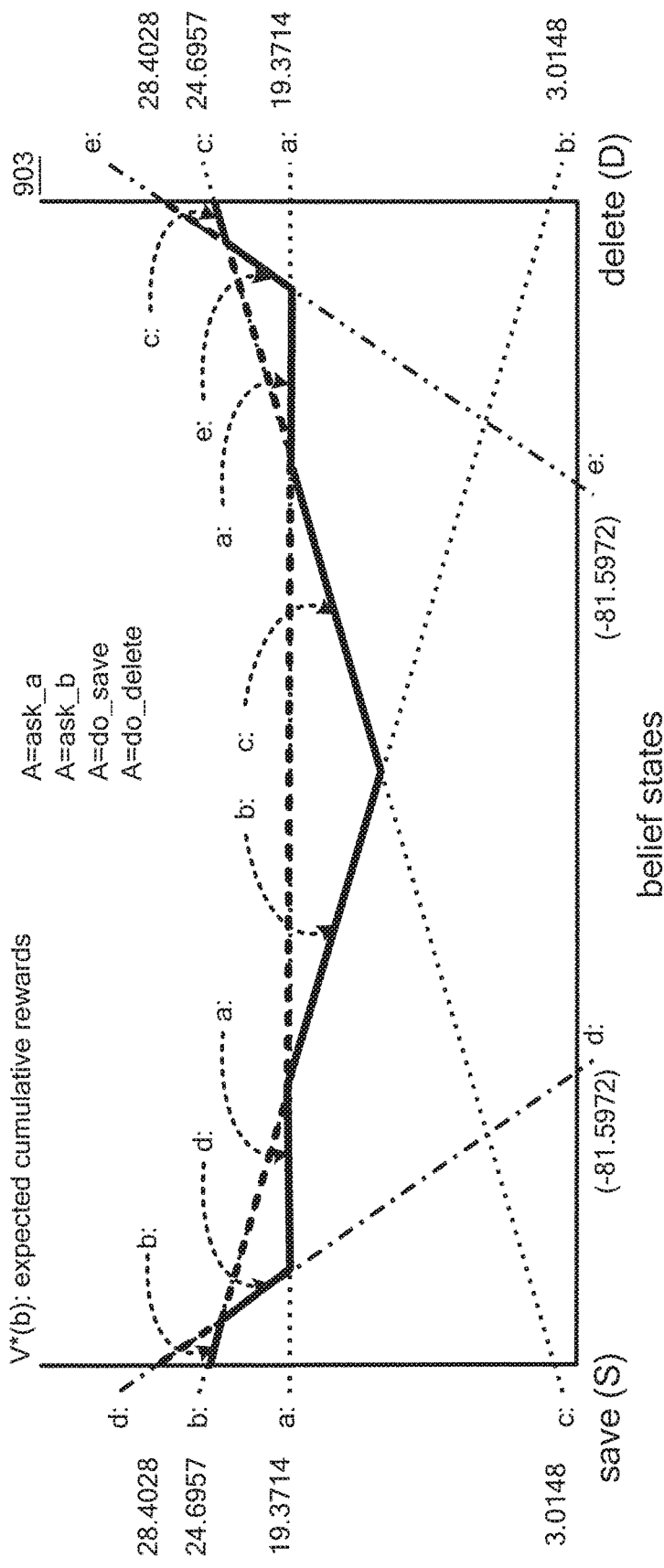

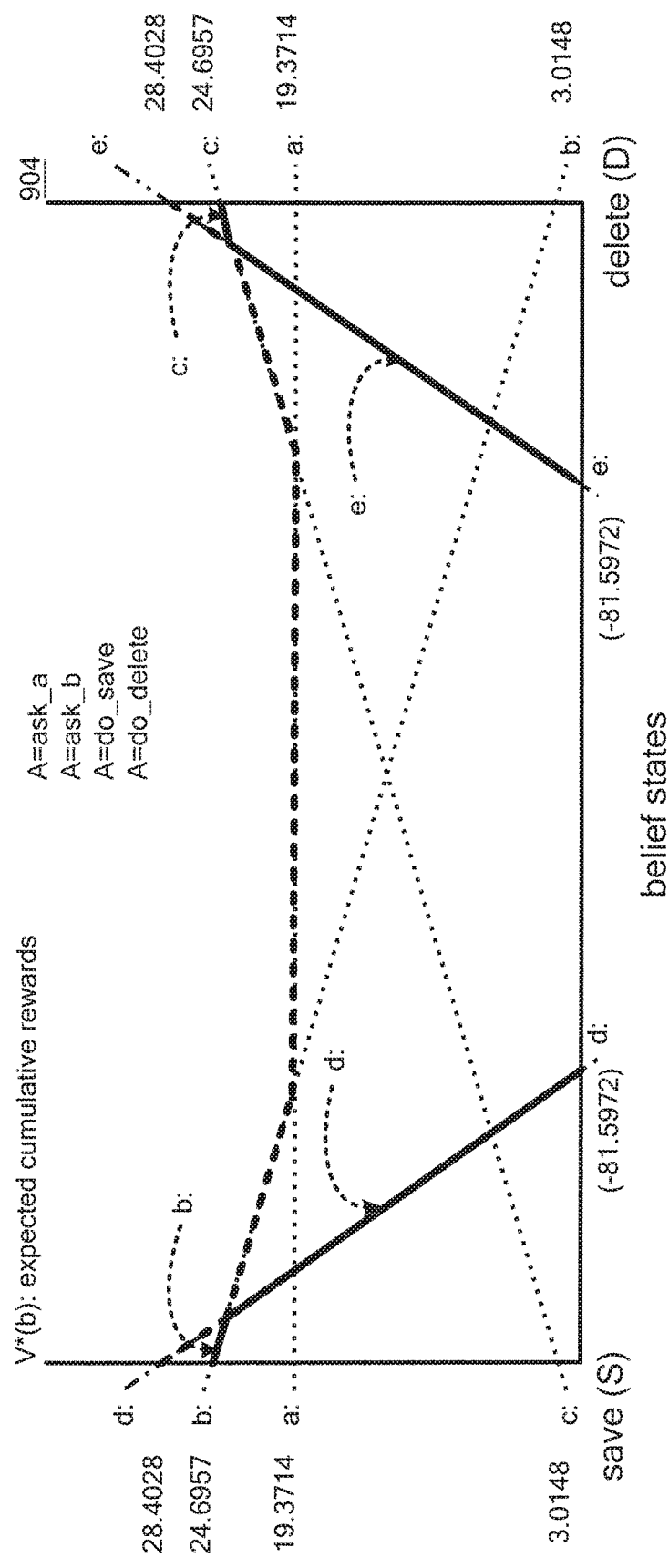

PARTIALLY OBSERVED MARKOV DECISION PROCESS MODEL AND ITS USE

BACKGROUND

Technical Field

The present invention generally relates to a Partially Observed Markov Decision Process (herein after also referred to as "POMDP") model and its use.

Description of the Related Art

It is a difficult problem to determine which action a system should take in a given situation in spoken dialog systems, which help a user accomplish a task using a spoken language, because automatic speech recognition is unreliable and, therefore, the state of the conversation can never be known with certainly. The task mentioned above may be an operation of a robot or an operation completed by a natural conversation dialog.

The POMDP has been recently used for solving this problem. Many study reports describe the POMDP model.

SUMMARY

According to an embodiment of the present invention, a computer-implemented method for selecting an action is provided. The method comprises reading, into a memory, a Partially Observed Markov Decision Process (POMDP) model, the POMDP model having top-k action IDs for each of belief states, the top-k action IDs maximizing expected long-term cumulative rewards in each time-step, and k being an integer of two or more; in the execution-time process of the POMDP model, detecting a situation where an action identified by the best action ID among the top-k action IDs for a current belief state is unable to be selected due to constraint; and selecting and executing an action identified by the second best action ID among the top-k action IDs for the current belief state in response to a detection of the situation. The top-k action IDs may be top-k alpha vectors, each of the top-k alpha vectors having an associated action; or identifiers of top-k actions associated with alpha vectors.

According to another embodiment of the present invention, a system, such as a computer system, comprising a processor and a memory storing a program of instructions executable by the processor to perform one or more methods described herein is provided.

According to another embodiment of the present invention, a computer program product comprising a non-transitory computer readable storage medium storing a program of instructions executable by a system to perform one or more methods described herein is provided.

BRIEF DESCRIPTION OF THE DRAWINGS

The disclosure will provide details in the following description of preferred embodiments with reference to the following figures.

FIG. 3 illustrates a block/flow diagram of a process for selecting an action, using the POMDP model;

FIGS. 4A and 4B illustrate embodiment block/flow diagram of a process for building a POMDP model;

FIG. 5 illustrates a block/flow diagram of a process for selecting an action, using the POMDP model;

FIG. 6A illustrates a graph representing a set of the top-k (or k=2) alpha vectors for each of belief states, the set being generated according to an embodiment of the present invention;

FIG. 6C illustrates a graph representing a set of the top $2^{nd}$ (or k=2) alpha vectors for each of belief states, the set being generated according to another embodiment described in FIGS. 4A, 4B and 5 of the present invention;

FIG. 8 illustrates an example of parameters which is used in building the POMDP model for a natural conversation dialog, in accordance with an embodiment of the present invention;

FIG. 9A illustrates an example of a graph representing a set of the top-$1^{st}$ alpha vectors for each of belief states, after pruning according to the prior art;

FIG. 9B illustrates an example of a graph representing the best alpha vector for the corresponding belief state, among the set of the top-$1^{st}$ alpha vectors for each of belief states, after pruning according to the prior art;

FIG. 9C illustrates an example of a graph representing the top $2^{nd}$ best alpha vectors for the corresponding belief state, among the set of the top-$1^{st}$ alpha vectors for each of belief states, after pruning according to the prior art; and FIG. 9D illustrates an example of a graph representing the $2^{nd}$ best action for the corresponding belief state, among a se of the actions corresponding to the set of the top-$1^{st}$ alpha vectors for each of belief states, after pruning according to the prior art.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term "POMDP" is a type of reinforcement learning and is a framework for an action selection problem in an environment with hidden states.

The POMDP is defined as the following tuple, $\{S, A, T, R, O, Z, \lambda, b_0\}$: where S denotes a (finite) set of states describing the agent's (or system's) world; A denotes a set of discrete actions that an agent may take; T denotes a transition probability, $P(s'|s, a)$; R denotes the expected (immediate, real-valued) reward, r(s, a); O denotes a set of observations the gent can receive about the world; Z denotes an observation probability, P(o'|s', a); λ denotes a geometric discount factor, 0≤λ≤1; and $b_0$ denotes an initial belief state, $b_0$ (s).

The POMDP may operate as follows: At each time-step, the world is in some unobserved state, s∈S; since s is not exactly known, a distribution over states is maintained called "a belief state", b, with initial belief state, $b_0$. In a case where $b_0$(s) is mentioned, $b_0$(s) indicates the probability of being in a particular state, s. Based on b, the system selects an action, a∈A, receives a reward, r(s, a), and then transitions to an unobserved state s'. The unobserved state, s', depends only on the state, s, and the action, a. At each time-step, the brief state distribution b is updated.

Figure 1:
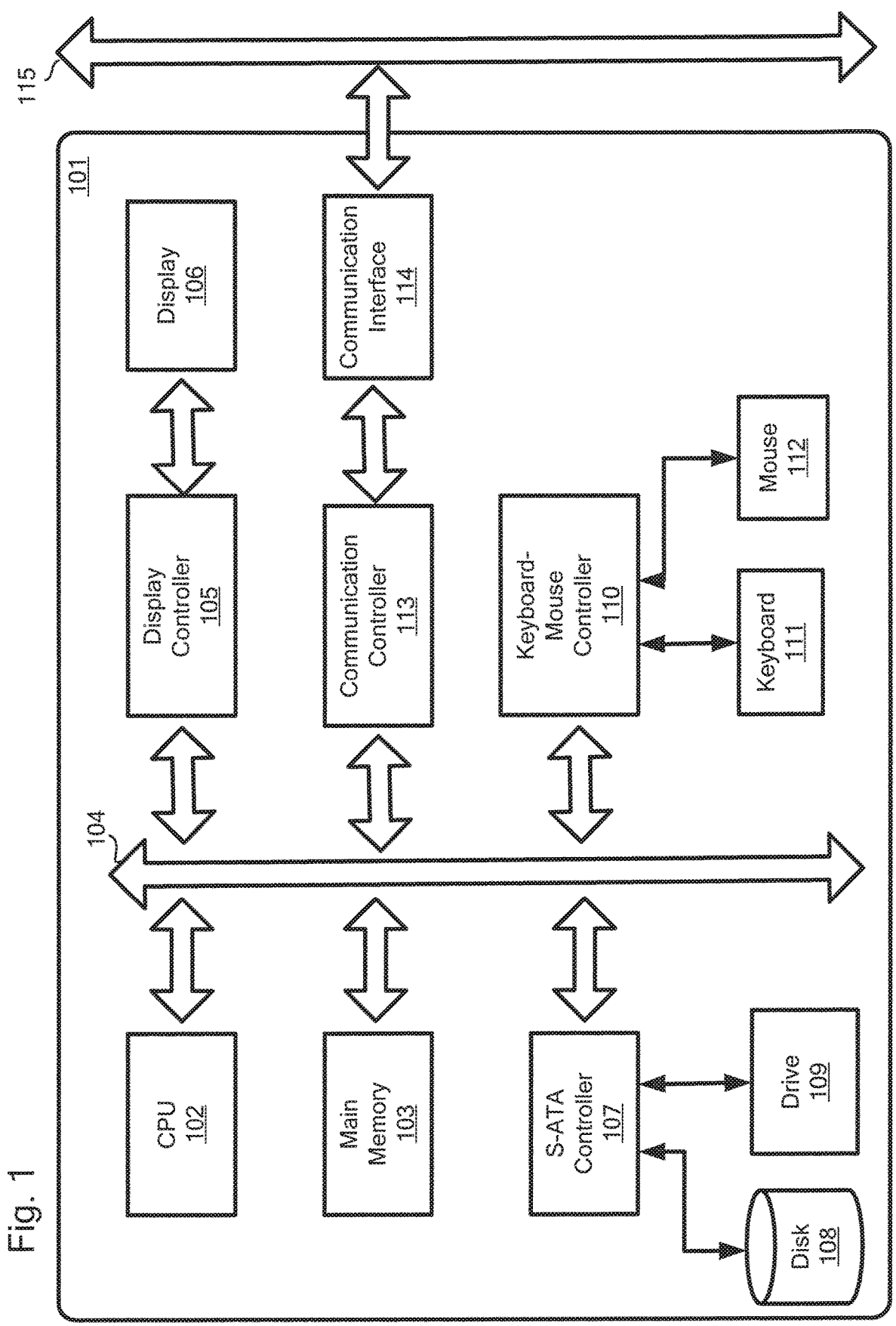
FIG. 1 illustrates an exemplified basic block diagram of a computer hardware used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106), such as a liquid crystal display (LCD), may be connected to the bus (104) via a display controller (105). The display (106) may be used to display, for management of the computer(s), information on a computer connected to a network via a communication line and information on software running on the computer using an appropriate graphics interface. A disk (108), such as a hard disk or a solid state drive (SSD), and a drive (109), such as a CD, a DVD, or a BD (Blu-ray disk) drive, may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

The idea of an embodiment of the present invention is on the basis of the following perceptions.

In a spoken dialog by a POMDP model, since the best action which maximizes long-term cumulative rewards is selected for a probabilistic belief state, the same action is selected for a (the) near belief state. Accordingly, the same action can be repeated or selected many times.

For example, in the following Non-patent Literature [A]: Jason D. Williams et al., "Partially observable Markov decision processes for spoken dialog systems", Computer Speech & Language, Vol. 21, p. 393-422, 2007, FIG. 3 describes the optimal policy for an example voice mail spoken dialog system POMDP in which an action for a save or delete task is executed, and FIG. 4 describes an evolution of the belief state in the example voicemail spoken dialog system POMDP. In the task described in FIG. 4 above, the example process repeats the same action, "ask", three times to determine a final save/delete decision.

In a natural conversation among a plurality of users, if the state (intent) of user that you are talking to is unclear, you may repeat the same question in a different way. In the POMDP model, however, such a constraint in execution-time process where exactly the same question is not repeated is hard to be previously included into the POMDP model.

Further, the calculation of the best actions for a belief state has a heavy computational complexity. Since the best actions must be calculated in advance during building the POMDP model, it is difficult to take the constraint in the execution-time process into consideration in the calculation time.

In a case where the constraint used in the execution-time process of the POMDP model can be previously predicted, the constraint can be taken into consideration in building time of the POMDP model. In such a case, however, the number of states increases and, accordingly, computing complexity also increases. Further, since the number of states increases, accuracy of estimation of state transition probability and observation probability become worse with the same amount of data.

Accordingly, it may be required to cope with such constraint. In other words, even in a case where the best action for a current belief state cannot be selected due to constraints in the execution-time process of the POMDP model, it may be required to select an action appropriate to the current belief state.

In a case where an action identified by the best alpha vector among the set of top-$1^{st}$ alpha vectors for each of belief states is unable to be selected due to constraints in an execution-time process of the POMDP model, the system may select another alpha vector among the set of top-$1^{st}$ alpha vectors for each of belief states. For example, in a situation that an action, "ask_a", is identified by the best alpha vector for a certain belief state, among the set of top-$1^{st}$ alpha vectors for each of belief states, the system may select another action, "do_delete", which is identified by the best alpha vector for another belief state, among the set of top-$1^{st}$ alpha vectors for each of belief states. However, under a condition that the action, "do_delete", is significantly inappropriate for a current belief state, the system cannot select an executable action. This might cause the system to abnormally terminate a natural conversation dialog.

This problem is also true of the following Patent Literature [1]: JP 2012-190062 A. This is because Patent Literature [1] describes a point-based value iteration algorithm and use this algorithm without any modification, where the point-based value iteration algorithm is described, for example, in the following Non-patent Literature [B]: Hanna Kurniawati et al., "SARSOP: Efficient Point-Based POMDP Planning by Approximating Optimally Reachable Belief Spaces", Proc. Robotics: Science and Systems, 2008.

Further, Patent Literature [1] does not cope with such constraint.

Prior to describing an embodiment of the present invention, pruning or selection of alpha vectors in building time of the POMDP model generated according to the prior art will be described below by referring to FIG. 8 and FIGS. 9A to 9D.

According to the prior art, only the top-$1^{st}$ alpha vectors for each belief state is selected during building the POMDP model. In other words, alpha vectors other than the top-$1^{st}$ alpha vectors for each belief state are pruned during building the POMDP model.

First, a system prepares input data for building the POMDP model. An example of the input data will be explained by referring to FIG. 8.

With reference now to FIG. 8, FIG. 8 illustrates an example of parameters which may be used in building the POMDP model for a natural conversation dialog.

FIG. 8 shows the following parameters, {S, A, T, R, O, Z, λ, $b_0$}, in which the following parameters, {S, A, T, R, O, Z}, are input to a POMDP solver. The POMDP solver solves problems that are formulated as POMDP. The POMDP solver uses the basic dynamic programming approach for all algorithms, solving one stage at a time working backwards in time. Any algorithm for the POMDP solver can be used herein.

For building the POMDP model, the parameters, {S, A, T, R, O, Z}, are inputted to the POMDP solver. The details of these parameters will be explained below.

States: S={save, delete}; where S denotes that the voice mail should be saved or deleted.

Actions: A={ask_a,ask_b, do_save, do_delete}; where Action, {ask_a}, denotes that "Do you want to save or delete the mail?", this question can be expected to receive an accurate response; Action, {ask_b}, denotes that "Would you like to keep or discard the mail?", this question cannot be relatively expected to receive an accurate response; Action, {do_save}, denotes that an agent makes an action of saving the mail; and Action, {do_delete}, denotes that an agent makes an action of deleting the mail.

Transition function: T (s, a, s')=Pr (s'|S, a); The items in Table (801), (save, do_save), (save, do_delete), (delete, do_save) and (delete, do_delete), has the numeral, 0.5. This means that after execution of the action, "do_save" or "do_delete", the belief state goes back to the initial state, $b_0$.

Reward function: R (s, a); Each of the items in Table (802), (save, do_save) and (delete, do_delete), has the numeral, 10. This means that 10 rewards are given in a case where the action of "save" or "delete" is correctly done; Each of the items in Table (802), (save, do_delete) and (delete, do_save), has the numeral, −100. This means that −100 rewards are given in a case where the action of "save" or "delete" is erroneously done.

Observations: O={O_save, O_delete}; The observations denotes a response from a user.

Observation function: Z (s', A, O')=Pr (o'|s', a); The items in Table (803), (save, do_save), (save, do_delete), (delete, do_save) and (delete, do_delete), has the numeral, 0.5. This means that after execution of the action, "do_save" or "do_delete", the belief state goes back to the initial state, $b_0$. The items in Table (803), (save, ask_a), (save, ask_b), (delete, ask_a) and (delete, ask_b), show that, by "ask_a", more accurate answer will be received than "ask_b".

The system calculates a set of the alpha vectors for the POMDP model from the input data, using a POMDP solver, to build the POMDP model. The system outputs a policy, i.e., a set of the top-$1^{st}$ alpha vectors. The alpha vectors, which were output from the POMDP solver, are a set of the top-$1^{st}$ alpha vectors for each belief state among the calculated alpha vectors in each time-step. In other words, alpha vectors other than the set of the top-$1^{st}$ alpha vectors for each belief state are pruned during the building the POMDP model.

FIGS. 9A to 9D each illustrate a graph generated according to the prior art, the graph representing a set of top-$1^{st}$ alpha vectors for each belief state.

With reference now to FIG. 9A, FIG. 9A illustrates an example of a graph representing a set of the top-$1^{st}$ alpha vectors for each belief state after pruning according to the prior art.

According to the prior art, alpha vectors other than a set of the top-$1^{st}$ alpha vectors for each belief state are pruned during building the POMDP model.

A table (981) shows a set of top-$1^{st}$ alpha vectors for each belief state, i.e., the output of the POMDP solver. The set of the top-$1^{st}$ alpha vectors for each belief state is a result after 664 updates of each of the belief states and obtained by pruning alpha vectors other than the set of the top-$1^{st}$ alpha vectors for each belief state. In other words, the top-$1^{st}$ alpha vectors for each belief state is iteratively calculated until alpha vectors are converged.

The table (981) shows five alpha vectors a, b, c, d and e. Each of the five alpha vectors is associated with a respective action, as follows: each of the alpha vectors a, b and c is associated with the same action, "ask_a"; the alpha vector d is associated with the action, "do_save"; and the alpha vector e is associated with the action, "do_delete".

The graph (901) shows an x-axis representing "belief states", i.e., "save (S)" and "delete (D)" and a y-axis representing the expected cumulative rewards, V*(b).

In the graph (901), the lines a, b, c, d and e correspond to the alpha vectors a, b, c, d and e, respectively. Accordingly, the lines a, b, c, d and e are associated with the actions, "ask_a", "ask_a", "ask_a", "do_save" and "do_delete", respectively.

In each of the following FIGS. 9B, 9C and 9D, a graph (902, 903 and 904, respectively) is shown in which a policy is illustrated with bold combined lines, where the graph (902, 903 and 904, respectively) corresponds to the graph (901).

With reference now to FIG. 9B, FIG. 9B illustrates an example of a graph representing the best alpha vector for the corresponding belief state, among the set of the top-$1^{st}$ alpha vectors for each belief state, the best alpha vector maximizing expected long term cumulative rewards.

The graph (902) corresponds to the graph (901) described in FIG. 9A, except that the bold combined lines are illustrated. A table (982) corresponds to the table (981) described in FIG. 9A. The alpha vectors in the table (982) correspond to those in the table (981) described in FIG. 9A.

In the graph (902), the bold combined lines show the best alpha vector for the corresponding belief state, among the set of the top-$1^{st}$ alpha vectors for each belief state. The bold combined lines also show a policy. From the left to right in the bold combined lines, each part on the bold combined lines corresponds to alpha vectors d, b, a, c and e is selected as the best alpha vector for the corresponding belief state among the set of the top-$1^{st}$ alpha vectors for each belief state. The alpha vector d is associated with the action, "do_save", and, therefore, the part on the bold combined lines corresponding to the alpha vector d is associated with the action, "do_save". Each of the alpha vectors b, a and c is associated with the same action, "ask_a", and, therefore, each part on the bold combined lines corresponding to the alpha vectors b, a and c is associated with the same action, "ask_a". The alpha vector d is associated with the action, "do_save", and, therefore, the part on the bold combined lines corresponding to the alpha vector d is associated with the action, "do_save". The alpha vector e is associated with the action, "do_delete", and, therefore, the part on the bold combined lines corresponding to the alpha vector e is associated with the action, "do_delete".

Accordingly, the best alpha vector for the corresponding belief state, among the set of the top-$1^{st}$ alpha vectors for each belief state is provided according to the prior art, as illustrated in the graph (902).

With reference now to FIG. 9C, FIG. 9C illustrates an example of a graph representing the $2^{nd}$ best alpha vector for the corresponding belief state, among the set of the top-$1^{st}$ alpha vectors for each of belief states, the $2^{nd}$ best alpha vector secondary maximizing expected long term cumulative rewards.

The graph (903) corresponds to the graph (901) described in FIG. 9A, except that the bold combined lines and the bold combined dot-lines are illustrated. A table (983) corresponds to the table (981) described in FIG. 9A. The alpha vectors in the table (983) corresponds to those in the table (981) described in FIG. 9A.

In the graph (903), the bold combined dot-lines correspond to the bold combined lines in the graph (902) described in FIG. 9B, where the bold combined dot-lines described in the graph (903) are shown for the purpose of comparing this bold combined dot-lines with the bold combined lines in the graph (902) described in FIG. 9B.

In the graph (903), the bold combined lines show the $2^{nd}$ best alpha vector for the corresponding belief state among the set of the top-$1^{st}$ alpha vectors for each of belief states. These bold combined lines also show a policy. From the left to right in the bold combined lines, each part on the bold combined lines corresponding to the alpha vectors b, d, a, b, c, a, e, and c is selected as the $2^{nd}$ best alpha vector (or the policy) for the corresponding belief state, among the set of the top-$1^{st}$ alpha vectors for each belief state. Each of the alpha vectors b, a and c is associated with the same action, "ask_a", and, therefore, each part on the bold combined lines corresponding to the alpha vectors b, a and c is associated with the same action, "ask_a". The alpha vector d is associated with the action, "do_save", and, therefore, the part on the bold combined lines corresponding to the alpha vector d is associated with the action, "do_save". The alpha vector e is associated with the action, "do_delete", and, therefore, the part on the bold combined lines corresponding to the alpha vector e is associated with the action, "do_delete".

Accordingly, the $2^{nd}$ best alpha vector for the corresponding belief state among the set of the top-$1^{st}$ alpha vectors for each belief state is provided according to the prior art, as illustrated in the graph (903).

According to the graph (903), in a case where the best alpha vector among the set of the top-$1^{st}$ alpha vectors for each belief state is not selected due to constraints in execution-time process of the POMDP model, the $2^{nd}$ best alpha vector for the corresponding belief state among the set of the top-$1^{st}$ alpha vectors for each belief state is selected as a policy.

Comparing, from the left to right in the graph (903), the bold combined lines with the bold combined dot-lines, the action, "ask_a", corresponding to the part b on the bold combined lines is selected instead of the action, "do_save", corresponding to the part d on the bold combined dot-lines; the action, "do_save", corresponding to the part d on the bold combined lines and the action, "ask_a", corresponding to the part a on the bold combined lines are selected instead of the action, "ask_a", corresponding to the part b on the bold combined dot-lines; the action, "ask_a", corresponding to the part b on the bold combined lines and the action, "ask_a", corresponding to the part c on the bold combined lines are selected instead of the action, "ask_a", corresponding to the part a on the bold combined dot-lines; the action, "ask_a", corresponding to the part a on the bold combined lines and the action, "do_delete", corresponding to the part e on the bold combined lines are selected instead of the action, "ask_a", corresponding to the part c on the bold combined dot-lines; and the action, "ask_a", corresponding to the part c on the bold combined lines is selected instead of the action, "do_delete", corresponding to the part e on the bold combined dot-lines.

Accordingly, in a case where the $2^{nd}$ best alpha vector for the corresponding belief state, among the set of the top-$1^{st}$ alpha vectors for each belief state is selected as illustrated in the graph (903), the same action may be selected on the parts a, b, c from the left to right on the bold combined lines in the graph (903), compared to the bold combined dot-lines. Meanwhile, a different action may be selected on the parts b, d, and e, c from the left to right on the bold combined lines in the graph (903), compared to the bold combined dot-lines. This is because, in the former case, the same action, "ask_a", is associated with the lines a, b and c.

Accordingly, in a case where an action identified by the $2^{nd}$ best alpha vector for the corresponding belief state among the set of the top-$1^{st}$ alpha vectors for each belief state is the same as that identified by the best alpha vector for the corresponding belief state among the set of the top-$1^{st}$ alpha vectors for each belief state, a different action cannot be selected using the graph (903) due to constraints in execution-time process of the POMDP model.

With reference now to FIG. 9D, FIG. 9D illustrates an example of a graph representing the $2^{nd}$ best action for the corresponding belief state, among a set of the actions corresponding to the set of the top-$1^{st}$ alpha vector for each of the belief states.

The graph (904) corresponds to the graph (901) described in FIG. 9A, except that the bold combined lines and the bold combined dot-lines are illustrated. A table (984) corresponds to the table (981) described in FIG. 9A. The alpha vectors in the table (984) corresponds to those in the table (981) described in FIG. 9A.

In the graph (904), the bold combined dot-lines corresponds to the bold combined lines described in FIG. 9B, where the dot-line described in the graph (904) are shown for the purpose of comparing this bold combined lines with the bold combined lines in the graph (902) described in FIG. 9B.

In the graph (904), the bold combined lines show the $2^{nd}$ best action for the corresponding belief state, among a set of the actions associated with the set of the top-$1^{st}$ alpha vectors for each belief state. This $2^{nd}$ best action is different with the best action for the corresponding belief state, among the set of the actions associated with the set of the top-$1^{st}$ alpha vectors for each belief state. This best action is the same as the best alpha vector (shown in the bold combined dot-line in the graph (904)) for the corresponding belief state among the set of the top-$1^{st}$ alpha vectors for each belief state. These bold combined lines also correspond to a policy. From the left to right in the bold combined lines, each part on the bold combined lines corresponding to the alpha vectors b, d, e, and c is selected as the $2^{nd}$ best action (or the policy) for the corresponding belief state, among the set of the actions associated with the set of the top-$1^{st}$ alpha vectors for each belief state. Each of the alpha vectors b and c is associated with the same action, "ask_a", and, therefore, each part on the bold combined lines corresponding to the alpha vectors b and c is associated with the same action, "ask_a". The alpha vector d is associated with the action, "do_save", and, therefore, the part on the bold combined lines corresponding to the alpha vector d is associated with the action, "do_save". The alpha vector e is associated with the action, "do_delete", and, therefore, the part on the bold combined lines corresponding to the alpha vector e is associated with the action, "do_delete".

Accordingly, the $2^{nd}$ best action for the corresponding belief state, among the set of the actions associated with the set of the top-$1^{st}$ alpha vectors for each belief state is provided according to the prior art, as illustrated in the graph (904).

According to the graph (904), in a case where the best actions among the set of the actions associated with the set of the top-$1^{st}$ alpha vectors for each of belief states is not selected due to constraints in execution-time process of the POMDP model, the $2^{nd}$ best action for the corresponding belief state, among actions associated with the set of the top-$1^{st}$ alpha vectors for each belief state is selected as a policy. Although the $2^{nd}$ best action for the corresponding belief state, among the set of the actions associated with the set of the top-$1^{st}$ alpha vectors for each belief state is different from the best action for the corresponding belief state, among the set of the actions associated with the set of the top-$1^{st}$ alpha vectors for each belief state and, therefore, it is not said that this $2^{nd}$ best action is not selected due to the constraints s in execution-time process of the POMDP model, but the value of expected long term cumulative rewards for this $2^{nd}$ best action is lower than that for this best action and, therefore, this $2^{nd}$ best action is not an appropriated selection.

Comparing, from the left to right in the graph (904), the bold combined lines with the bold combined dot-lines, the action, "ask_a", corresponding to the part b on the bold combined lines is selected instead of the action, "do_save", corresponding to the part d on the bold combined dot-lines; the action, "do_save", corresponding to the part d on the bold combined lines is selected instead of the action, "ask_a", corresponding to the part b on the bold combined dot-lines and the action, "ask_a", corresponding to the part b on the bold combined dot-lines; the action, "do_delete", corresponding to the part e on the bold combined lines is selected instead of the action, "ask_a", corresponding to the part b on the bold combined dot-lines and the action, "ask_a", corresponding to the part c on the bold combined dot-lines; and the action, "ask_a", corresponding to the part c on the bold combined lines is selected instead of the action, "do_delete", corresponding to the part e on the bold combined dot-lines.

Accordingly, it may be difficult to cope with, using the graph (904), a situation where the $2^{nd}$ best action for the corresponding belief state, among the set of the actions associated with the set of the top-$1^{st}$ alpha vectors for each belief state is unable to be selected due to lower expected long term cumulative rewards.

Hereinafter, an embodiment of the present invention will be described with reference to the following FIGS. 2A and 2B, FIG. 3, FIGS. 4A and 4B, FIG. 5, FIGS. 6A to 6C and FIG. 7.

Embodiments of a block/flow diagram illustrating a process for building a POMDP model and for selecting, using the POMDP model, an action are described in each of FIGS. 2A, 2B and 3, and FIGS. 4A, 4B and 5.

Figure 2A:
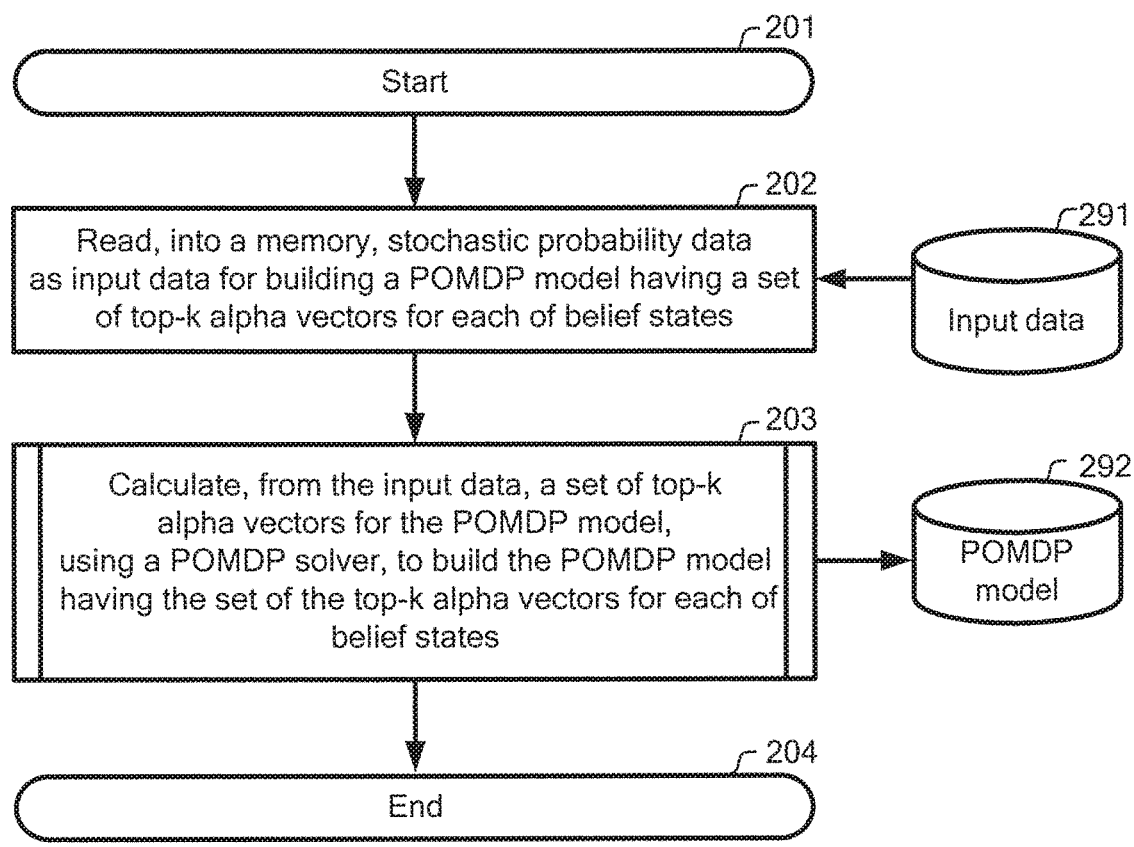
FIGS. 2A and 2B illustrate a block/flow diagram of a process for building a POMDP model.
Figure 2B:
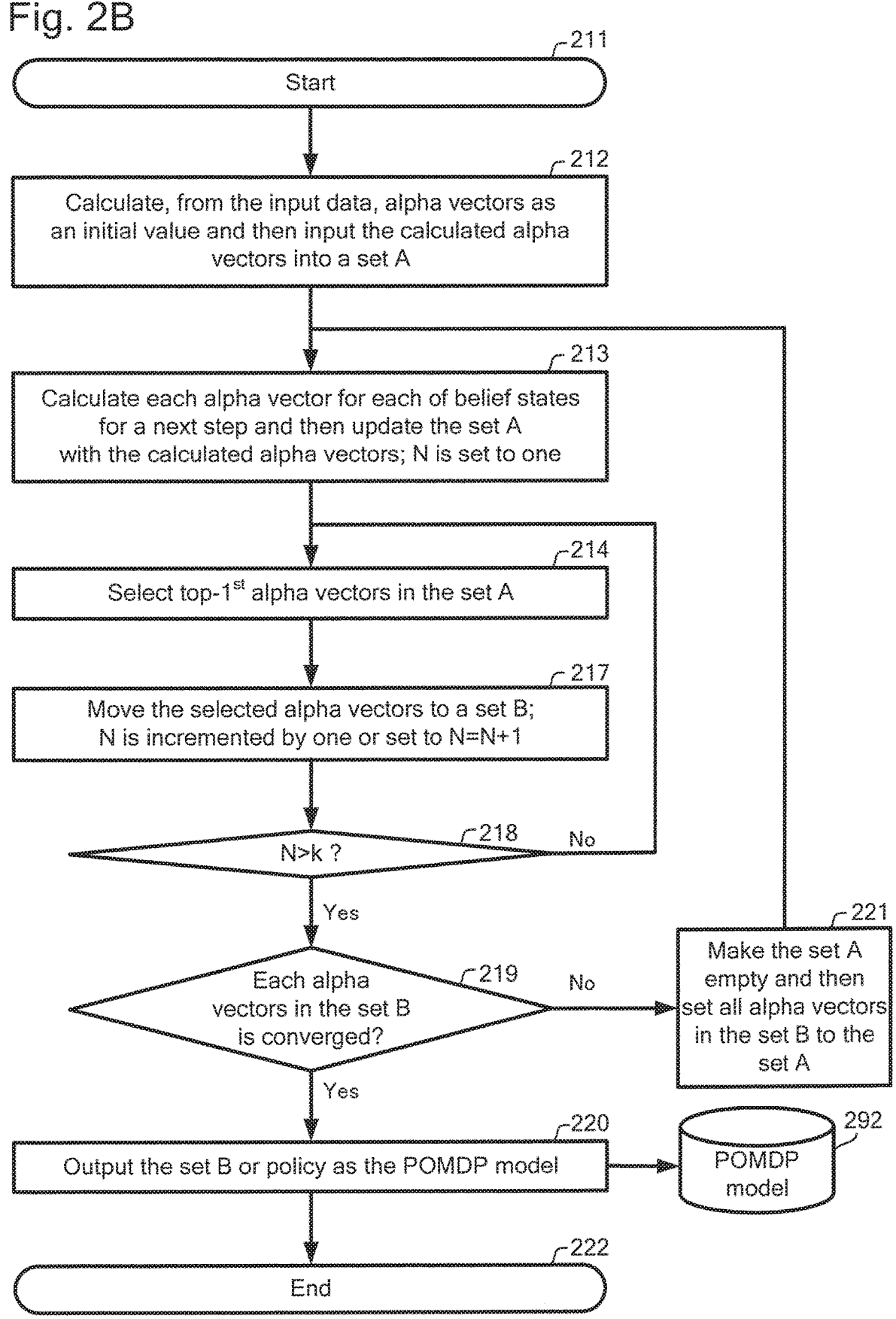
Figure 4B:
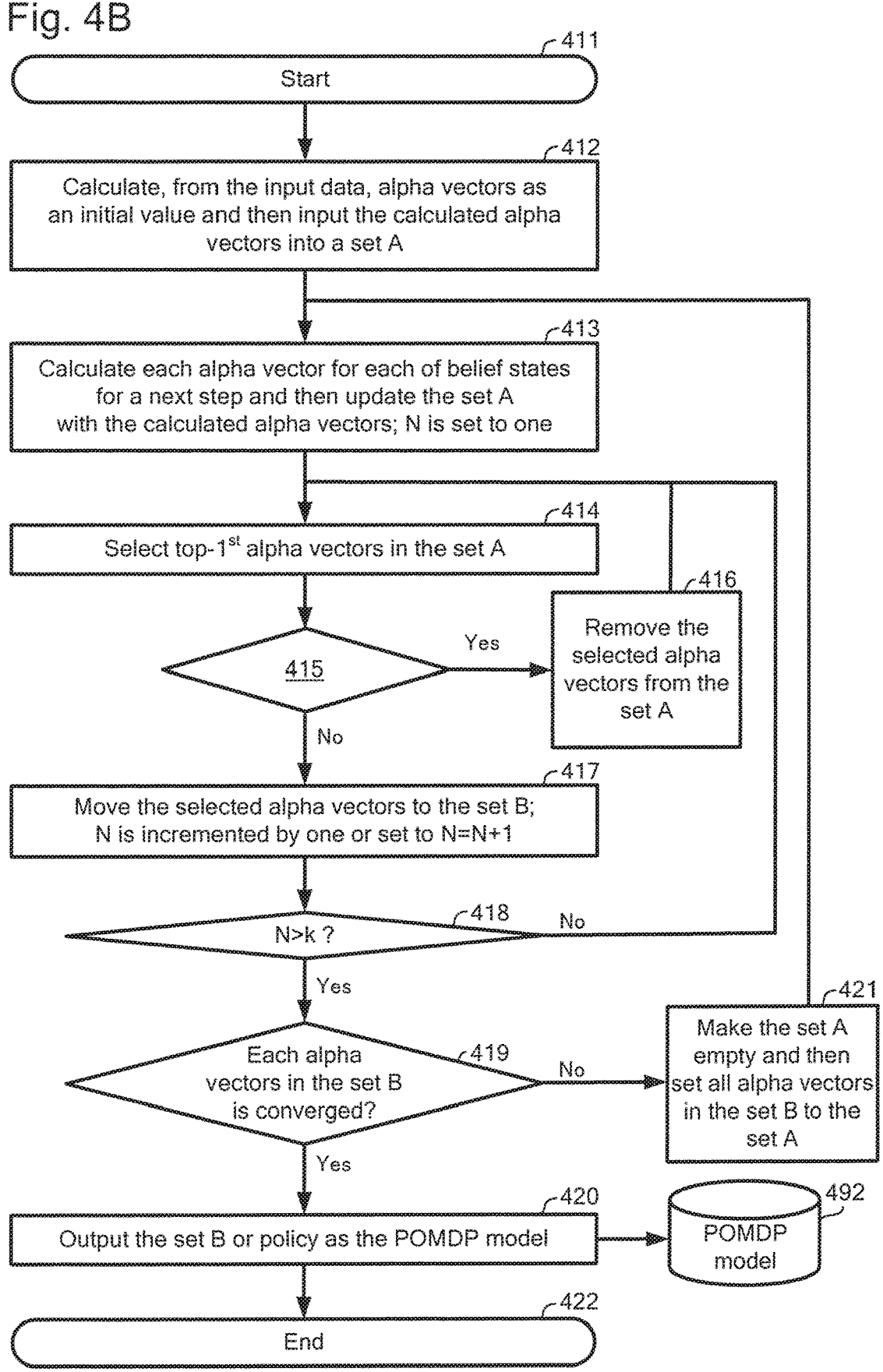

The flowcharts described in FIGS. 2A, 2B and 3 are illustrated in a case where the POMDP model having a set of top-k alpha vectors for each of belief states is used, where k is an integer of two or more, and, then, an action identified by the $2^{nd}$ best alpha vector for the current belief state, among the top-k alpha vectors for each belief state is selected and executed. Meanwhile, the flowcharts described in FIGS. 4A, 4B and 5 are illustrated in a case where the MPODP model having a set of top-k actions for each belief state is used, where actions in the set of top-k actions are different from each other, k is an integer of two or more, and, then, the $2^{nd}$ best action for the current belief state, among the set of the actions associated with the set of the top-k alpha vectors for each belief state is selected and executed.

With reference now to FIG. 2A, FIG. 2A illustrates one embodiment of a process for building a POMDP model having a set of top-k alpha vectors for each belief state, each of the top-k alpha vectors maximizing expected long-term cumulative rewards in each time-step, where k is an integer of two or more.

A system, such as the computer (101), performs each of the steps described in FIG. 2A. The system may be implemented as a single computer or a plurality of computers.

In step 201, the system starts the process for building the POMDP model described above.

In step 202, the system reads, into a memory, schematic probability data as input data from a storage (291) for building the POMDP model. The input data may be S, A, T, R, O and Z described above.

In step 203, the system calculates, from the input data, a set of top-k alpha vectors for the POMPD, using a POMDP solver, to build the POMDP model having the set of the top-k alpha vectors, where the set of the top-k alpha vectors are calculated for each belief state. A user who may decide a value, k, knows how many top actions are necessary. In other words, the value of k may be determined by how many alternative alpha vectors are required in an execution-time process of the POMDP model, where the alternative alpha vectors are calculated in each belief state. The alpha vectors may be calculated using, for example, but not limited to a point-based value iteration algorithm with modifying it so that the top-k alpha vectors for each belief state are maintained without pruning. The details of the step 203 will be further described below with reference to FIG. 2B.

In step 204, the system terminates the process described above.

With reference now to FIG. 2B, FIG. 2B illustrates one embodiment of a detailed process of the step 203 described in FIG. 2A.

In step 211, the system starts the process of the step 203.

In step 212, the system calculates, from the input data, alpha vectors as an initial value and then inputs the calculated alpha vectors into a set A.

In step 213, the system calculates each alpha vector for each belief state for a next step (or a next time) and then updates the set A with the calculated vectors, where a parameter, N, is set to one.

In step 214, the system selects, from the set A, top-$1^{st}$ alpha vectors.

In step 217, the system moves the selected alpha vectors to a set B in order to remove the selected alpha vectors from the set A and then N is incremented by one or is set to N=N+1.

In step 218, the system determines whether N is larger than k or not. If the determination is positive (e.g., yes), the system proceeds to step 219. Meanwhile, if the determination is negative (e.g., no), the system proceeds back to step 214 to repeat steps 214 to 218.

In step 219, the system determines whether each of the alpha vectors in the set B is converged or not. If the determination is positive, the system proceeds to step 220. Meanwhile, if the determination is negative, the system proceeds to step 221.

In step 220, the system outputs the set B into storage (292). The set B is a set of alpha vectors which were calculated without pruning of top-k alpha vectors. The set B is a policy as the POMDP model. In the set B, each alpha vectors is associated with an action. Each action may be prepared so that an action is not subject to a constraint in the execution-time process of the POMDP model that exactly the same question is not repeated. For example, in a case where an action is a natural conversation dialog, actions having similar meaning but different expressions are prepared. The different alpha vectors may be associated with the same action. Each action may be prepared so that an action is not subject to a constraint in the execution-time process of the POMDP model that exactly the same question is not repeated. For example, in a case where an action is a natural conversation dialog, actions having similar meaning but different expressions are prepared.

In step 221, the system makes the set A empty and then the system sets all alpha vectors in the set B to the set A. After, the system proceeds to step 213 in order to repeat steps 213, 214 and 217 to 219.

In step 222, the system terminates the process described above.

With reference now to FIG. 3, FIG. 3 illustrates one embodiment of a process for selecting an action, using the POMDP model which was built according to the flowchart described in FIGS. 2A and 2B. This POMDP model has a set of top-k alpha vectors for each belief state.

A system, such as the computer (101), performs each of the steps described in FIG. 3. The system may be implemented as a single computer or a plurality of computers. The system used in FIG. 3 may be the same or different from that used in FIGS. 2A and 2B.

In step 311, the system starts the process described above.

In step 312, the system reads, into a memory, the POMDP model from the storage (292) and then begins an execution of the POMDP model, where a parameter, N, is set to one.

In step 313, the system selects a top-N alpha vector which maximizes expected long-term cumulative rewards for a current belief state to identify an action associated with the selected alpha vector.

In step 314, the system determines whether the selected action is executable or not. If the determination is positive, the system proceeds to step 315. Meanwhile, if the determination is negative, the system proceeds to step 318 to increment N by 1 or set N=N+1

The determination is made using a constraint which may be determined by a user in advance. The user may determine the constraint by considering a situation where the POMDP model is used. The situation may be for example, but not limited to, an operation of the robot or an operation done by natural conversation dialog. For example, the constraint may be a constraint which restricts selecting the same actions in succession, in a case where the POMDP model is used for a natural conversation dialog.

In step 315, the system executes the selected action and then resets N.

In step 316, the system updates the belief state.

In step 317, the system determines whether the belief state satisfies an end condition or not. The end condition may be, for example, but not limited to, a condition that a goal of a problem is reached. In a case where a goal of a problem is an action for saving or deleting a task, it is an end condition to reach a belief state for executing a saving or deletion of a task. If the determination is positive, the system proceeds to a final step 321. Meanwhile, if the determination is negative, the system proceeds back to step 313.

In step 318, the system increments N by 1 or sets N=N+1.

In step 319, the system determines whether N is larger than k or not. If the determination is positive, the system proceeds to step 320. Meanwhile, if the determination is negative, the system proceeds back to step 313.

In step 320, the system terminates the process abnormally, since there is no executable action for the current belief state.

In step 321, the system terminates the process described above.

According to an embodiment of the present invention, even when an action associated with the best alpha vectors for the current belief state, among the top-k action IDs for each belief state cannot be selected due to constraints in execution-time process of the POMDP model, a $2^{nd}$ best action among a set of the top-k action IDs for each belief state can be selected, where k is an integer of two or more.

With reference now to FIG. 4A, FIG. 4A illustrates another embodiment of a process for building a POMDP model having a set of top-k actions associated with a set of alpha vectors for each belief state, each of the top-k actions maximizing expected long-term cumulative rewards in each time-step, where k is an integer of two or more.

A system, such as the computer (101), performs each of the steps described in FIG. 4A. The system may be implemented as a single computer or a plurality of computers.

In step 401, the system starts the process for building a POMDP model described above.

In step 402, the system reads, into a memory, schematic probability data as input data from storage (491) for building the POMDP model. The input data may be S, A, T, R, O and Z described above.

In step 403, the system calculates, from the input data, a set of top-k actions associated with a set of alpha vectors for the POMPD, using a POMDP solver, to build the POMDP model, where the top-k alpha vectors are calculated for each belief state. Actions in the set of top-k actions are different from each other. A user who may decide a value, k, knows how many top actions are necessary. In other words, the value of k may be determined by how many alternative actions are required in an execution-time process of the POMDP model, where the alternative actions are calculated in each belief state. The alpha vectors may be calculated using, for example, but not limited to a point-based value iteration algorithm with modifying it so that the top-k alpha vectors are maintained without pruning. The details of the step 403 will be further described below with reference to FIG. 4B.

In step 404, the system terminates the process described above.

With reference now to FIG. 4B, FIG. 4B illustrates one embodiment of the process of the step 403 described in FIG. 4A.

In step 411, the system starts the process of the step 403

Each of steps 412 to 414 corresponds to each of steps 212 to 214 described in FIG. 2B, respectively. Accordingly, the overlapping explanations of steps 412 to 414 will be omitted here.

In step 415, the system determines whether actions associated with the selected alpha vectors exist in a set B or not. If the determination is positive, the system proceeds to step 416. Meanwhile, if the determination is negative, the system proceeds to step 417. In the set B, the number of an alpha vector associated with the same action becomes at most one, according to a condition described in step 415.

In step 416, the system removes the selected alpha vectors from the set A.

In step 417, the system moves the selected alpha vectors to the set B in order to remove the selected alpha vectors from the set A and then N is incremented by one or is set to N=N+1.

Each of steps 418 to 420 corresponds to each of steps 218 to 220 described in FIG. 2B, respectively. Accordingly, the overlapping explanations of steps 418 to 420 will be omitted here.

In step 421, the system makes the set A empty and then the system sets all alpha vectors in the set B to the set A. After, the system proceeds to step 413 in order to repeat steps 413 to 419.

In step 422, the system terminates the process described above.

The POMPD includes the set of top-k actions associated with the set of alpha vectors for each belief state, where actions in the set of top-k actions are different from each other. Accordingly, in an execution-time process of the POMDP model, a different action is selected and executed, according to the process described in FIG. 4B.

With reference now to FIG. 5, FIG. 5 illustrates another embodiment of a process for selecting an action, using the POMDP model, which was built according to the flowchart described in FIGS. 4A and 4B. This POMDP model has a set of top-k actions associated with the set of alpha vectors for each belief state.

A system, such as the computer (101), performs each of the steps described in FIG. 5. The system may be implemented as a single computer or a plurality of computers. The system used in FIG. 5 may be the same or different from that used in FIGS. 4A and 4B.

In step 511, the system starts the process described above.

In step 512, the system reads, into a memory, the POMDP model from the storage (492) and then begins an execution of the POMDP model, where a parameter, N, is set to one.

In step 513, the system selects a top-N action associated with an alpha vector to identify an action associated with the selected alpha vector, the top-N action maximizing expected long-term cumulative rewards for a current belief state.

Each of steps 514 to 520 corresponds to each of steps 314 to 320 described in FIG. 3, respectively. Accordingly, the overlapping explanations of steps 514 to 520 will be omitted here.

In step 521, the system terminates the process described above.

According to an embodiment of the present invention, the $2^{nd}$ best action for the corresponding belief state, among a set of actions associated with top-k action IDs for the current belief state can be selected, where k is an integer of two or more. Accordingly, the system can cope with a constraint which is found in the execution-time process of the POMDP model, using the $2^{nd}$ best action for the corresponding belief state.

Figure 6B:
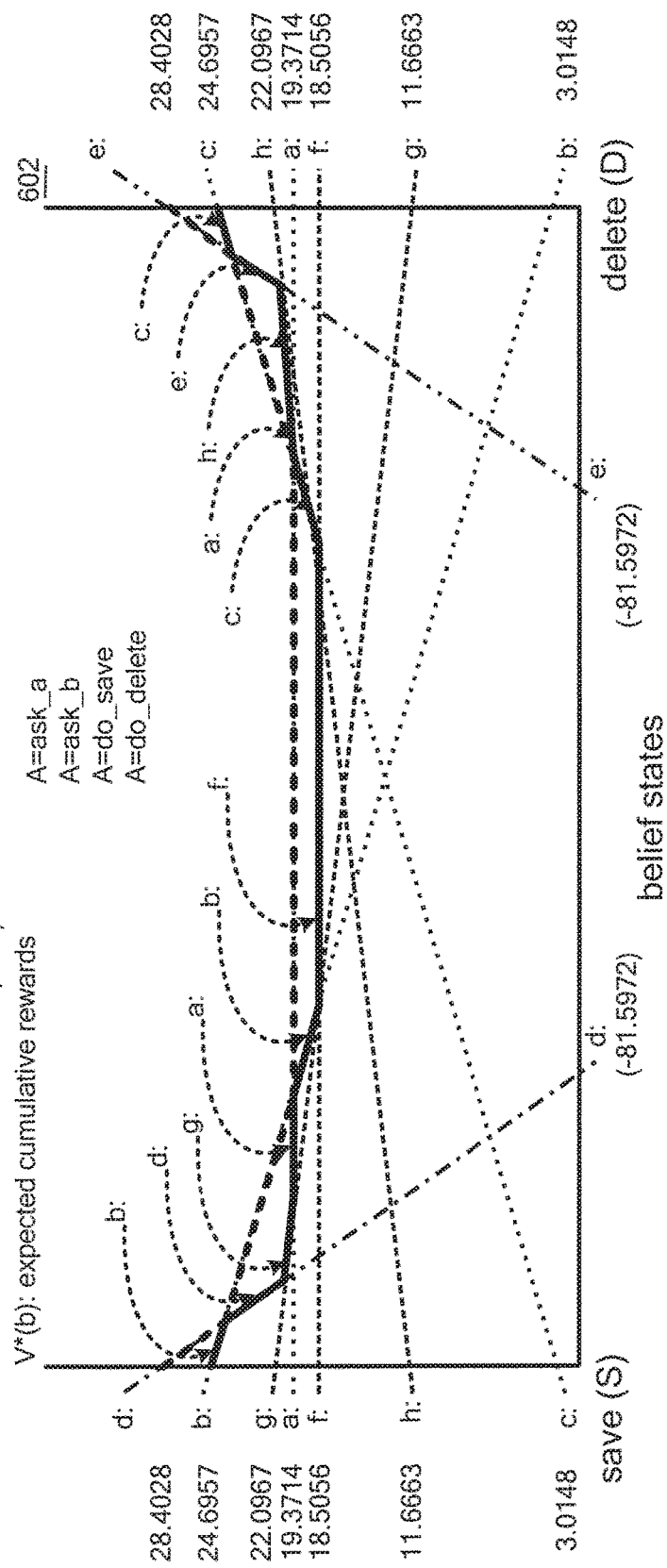
FIG. 6B illustrates a graph representing a set of the top-k (or k=2) alpha vectors for each of belief states, the set being generated according to an embodiment described in FIGS. 2A, 2B and 3 of the present invention.

FIGS. 6A to 6C each illustrate a graph representing a set of the top-$2^{nd}$ (or k=2) alpha vectors generated according to an embodiment of the present invention.

For generating the set of the top-$2^{nd}$ (or k=2) alpha vectors described above, the input data illustrated in FIG. 8 is used, where input data was also used for generating the set of the top-$1^{st}$ alpha vectors after pruning according to the prior art.

According to an embodiment of the present invention, alpha vectors other than the set of the top-k alpha vectors for each belief state are pruned during building the POMDP model, where k is an integer of two or more. Accordingly, alpha vectors which are pruned during building the POMDP model generated according to an embodiment of the present invention are different from alpha vectors which are pruned during building the POMDP model generated according to the prior art where alpha vectors other than the set of the top-$1^{st}$ alpha vectors for each belief state are pruned.

With reference now to FIG. 6A, FIG. 6A illustrates an embodiment of a graph representing a set of the top-$2^{nd}$ (or k=2) alpha vectors for each belief state, the graph being generated according to an embodiment of the present invention and illustrates the best alpha vector with bold combined dot-lines among the set of the top-$2^{nd}$ (or k=2) alpha vectors.

A table (681) denotes the top-$2^{nd}$ (or k=2) alpha vectors for each belief state, e.g., the outputs of the POMDP solver. The top-$2^{nd}$ alpha vectors for each belief state are results after 664 updates and obtained by pruning alpha vectors other than the top-$2^{nd}$ alpha vectors for each belief state. The alpha vectors are iteratively calculated until alpha vectors are converged, and then the top-$2^{nd}$ alpha vectors for each belief state are selected or alpha vectors other than the top-$2^{nd}$ alpha vectors for each belief state are pruned during building the POMDP model.

The table (681) shows the top-$2^{nd}$ alpha vectors for each belief state, e.g., eight alpha vectors a, b, c, d, e, f, g and h. In the eight alpha vectors, five alpha vectors a, b, c, d and e are the same as those described in the policy (981) described in FIG. 9A. Accordingly, the alpha vectors f, g and h as the top-$2^{nd}$ alpha vectors for each belief state remain without pruning, according to an invention of the present invention.

Each of the eight alpha vectors is associated with a respective action, as follows: each of the alpha vectors a, b and c is associated with the same action, "ask_a"; the alpha vector d is associated with the action, "do_save"; the alpha vector e is associated with the action, "do_delete", and each of the alpha vectors f, g and h is associated with the same action, "ask_b".

The graph (601) shows an x-axis representing "belief states", e.g., "save (S)" and "delete (D)" and a y-axis representing the expected cumulative rewards, V*(b).

In the graph, the lines a, b, c, d, e, f, g and h correspond to the alpha vectors a, b, c, d, e, f, g and h, respectively. Accordingly, the lines a, b, c, d, e, f, g and h are associated with the actions, "ask_a", "ask_a", "ask_a", "do_save", "do_delete", "ask_b", "ask_b" and "ask_b", respectively.

In the graph (601), the bold combined dot-lines show the best alpha vector for the corresponding belief state, among the set of the top-$2^{nd}$ alpha vectors for each belief state. The bold combined dot-lines in the graph (601) correspond to the bold combined lines in the graph (902) described in FIG. 9B.

The bold combined dot-lines in the graph (601) show the best alpha vector for the corresponding belief state among the set of the top-$2^{nd}$ alpha vectors for each belief state described in FIG. 6A.

With reference now to FIG. 6B, FIG. 6B illustrates an embodiment of a graph representing a set of the top-$2^{nd}$ (or k=2) alpha vectors for each belief state, the set being generated according to an embodiment of the flowchart described in FIGS. 2A, 2B and 3 and illustrates, with bold combined lines, the $2^{nd}$ best alpha vector for the corresponding belief state, among the among the set of the top-$2^{nd}$ (or k=2) alpha vectors for each belief state.

The graph (602) corresponds to the graph (601) described in FIG. 6A, except that the bold combined lines are illustrated. A table (682) corresponds to the table (681) described in FIG. 6A. The alpha vectors in the table (682) correspond to those in the table (681) described in FIG. 6A.

In the graph (602), the bold combined lines show the $2^{nd}$ best alpha vector for the corresponding belief state, among the set of the top-$2^{nd}$ alpha vectors for each belief state. From the left to right in the bold combined lines, each part on the bold combined lines corresponds to alpha vectors b, d, g, a, b, f, c, a, h, e and c is selected as the $2^{nd}$ best alpha vector for the corresponding belief state, among the set of the top-$2^{nd}$ alpha vectors for each belief state. Each of the alpha vectors b, a and c is associated with the same action, "ask_a", and, therefore, the part on each of the bold combined lines corresponding to the alpha vectors b, a and c is associated with the same action, "ask_a". The alpha vector d is associated with the action, "do_save", and, therefore, the part on the bold combined lines corresponding to the alpha vector d is associated with the action, "do_save". Each of the alpha vector g, f and h is associated with the same action, "ask_b", and, therefore, the part on the bold combined lines corresponding to the alpha vectors g, f and h is associated with the same action, "ask_b". The alpha vector e is associated with the action, "do_delete", and, therefore, the part on the bold combined lines corresponding to the alpha vector e is associated with the action, "do_delete".

Accordingly, the $2^{nd}$ best alpha vector for the corresponding belief state, among the set of the top-$2^{nd}$ alpha vectors for each belief state, is provided according to an embodiment of the present invention, as illustrated in the graph (602).

Comparing, from the left to right in the graph (602), the bold lines with the bold combined dot-lines, the action, "ask_b", corresponding to the part b on the bold combined lines is selected instead of the action, "do_save", corresponding to the part d on the bold combined dot-liens; the action, "do_save", corresponding to the part d on the bold combined lines and the action, "ask_b", corresponding to the part g on the bold combined lines are selected instead of the action, "ask_a", corresponding to the part b on the bold combined dot-liens; the action, "ask_a", corresponding to the part b on the bold combined lines, the action, "ask_b", corresponding to the part f on the bold combined lines and the action, "ask_a", corresponding to the part c on the bold combined lines are selected instead of the action, "ask_a", corresponding to the part a on the bold combined dot-liens; the action, "ask_a", corresponding to the part a on the bold combined lines, the action, "ask_b", corresponding to the part h on the bold combined lines and the action, "do_delete", corresponding to the part e on the bold combined lines are selected instead of the action, "ask_a", corresponding to the part c on the bold combined dot-liens; the action, "ask_a", corresponding to the part c on the bold combined liens is selected instead of the action, "do_delete", corresponding to the part e on the bold combined dot-lines.

In a case where the $2^{nd}$ best alpha vector for the corresponding belief state, among the set of the top-$2^{nd}$ alpha vectors for each belief state is selected as illustrated in the graph (602), the same action may be selected on the parts b, a, b, c, a and c from the left to right on the bold combined lines in the graph (602), compared to the bold combined dot-lines. Meanwhile, a different action may be selected on the parts d, g, f, h, and e from the left to right on the bold combined lines in the graph (602), compared to the bold combined dot-lines. This is because, in the former case, the same action, "ask_a", is associated with the lines a, b and c.

Accordingly, in the latter case, a different action identified by the $2^{nd}$ best alpha vector for the corresponding belief state, among the set of the top-$2^{nd}$ alpha vectors for each belief state is selected as the policy.

With reference now to FIG. 6C, FIG. 6C illustrates an embodiment of a graph representing a set of the top $2^{nd}$ (or k=2) alpha vectors for each of belief states, the set being generated according to the another embodiment of the flowchart described in FIGS. 4A, 4B and 5 and illustrates, with bold combined lines, the $2^{nd}$ best action for the corresponding belief state, among a set of actions associated with the set of the top $2^{nd}$ (or k=2) alpha vectors for each belief state.

The graph (603) corresponds to the graph (601) described in FIG. 6A, except that the bold combined lines are illustrated. A table (683) corresponds to the table (681) described in FIG. 6A. The alpha vectors in the table (683) correspond to those in the table (681) described in FIG. 6A.

In the graph (603), the bold combined lines show the $2^{nd}$ best action for the corresponding belief state, among the set of actions associated with the set of the top-$2^{nd}$ alpha vectors for each belief state. From the left to right in the bold combined lines, each part on the bold combined lines corresponds to alpha vectors b, d, g, f, h, e and c is selected as the $2^{nd}$ best action for the corresponding belief state, among the set of actions associated with the set of the top-$2^{nd}$ alpha vectors for each belief state. Each of the alpha vectors b and c is associated with the action, "ask-a", and, therefore, the part on each of the bold combined lines corresponding to the alpha vectors b and c is associated with the same action, "ask-a". The alpha vector d is associated with the action, "do_save", and, therefore, the part on the bold combined lines corresponding to the alpha vector d is associated with the action, "do_ave". Each of the alpha vector g and h is associated with the action, "ask_b", and, therefore, the part on the bold combined lines corresponding to the alpha vectors g and h is associated with the action, "ask_b". The alpha vector e is associated with the action, "do_delete", and, therefore, the part on the bold combined lines corresponding to the alpha vector e is associated with the action, "do_delete".

Accordingly, the $2^{nd}$ best action for the corresponding belief state, among the set of actions associated with the set of the top-$2^{nd}$ alpha vectors for each belief state, is provided according to another embodiment of the present invention, as illustrated in the graph (603).

Comparing, from the left to right in the graph (603), the bold lines with the bold combined dot-lines, the action, "ask_b", corresponding to the part b on the bold combined lines is selected instead of the action, "do_save", corresponding to the part d on the bold combined dot-liens; the action, "do_save", corresponding to the part d on the bold combined lines and the action, "ask_b", corresponding to the part g on the bold combined lines are selected instead of the action, "ask_a", corresponding to the part b on the bold combined dot-liens; the action, "ask_b", corresponding to the part g on the bold combined lines, the action, "ask_b", corresponding to the part f on the bold combined lines and the action, "ask_b", corresponding to the part h on the bold combined lines are selected instead of the action, "ask_a", corresponding to the part a on the bold combined dot-liens; the action, "ask_b", corresponding to the part h on the bold combined lines and the action, "do_delete", corresponding to the part e on the bold combined lines are selected instead of the action, "ask_a", corresponding to the part c on the bold combined dot-liens; and the action, "ask_a", corresponding to the part c on the bold combined liens is selected instead of the action, "do_delete", corresponding to the part e on the bold combined dot-lines.

In a case where the $2^{nd}$ best action for the corresponding belief state, among the set of actions associated with the set of the top-$2^{nd}$ alpha vectors for each belief state is selected as illustrated in the graph (602), a different action is selected. The $2^{nd}$ best action for the corresponding belief state, among the set of actions associated with the set of the top-$2^{nd}$ alpha vectors for each belief state, is different from the best action for the corresponding belief state, among the set of actions associated with the set of the top-$2^{nd}$ alpha vectors for each belief state. Further, the number of this $2^{nd}$ best action for the corresponding belief state is not necessarily same as that of this best action for the corresponding belief state, among the set of actions associated with the set of the top-$2^{nd}$ alpha vectors for each belief state.

Figure 7:
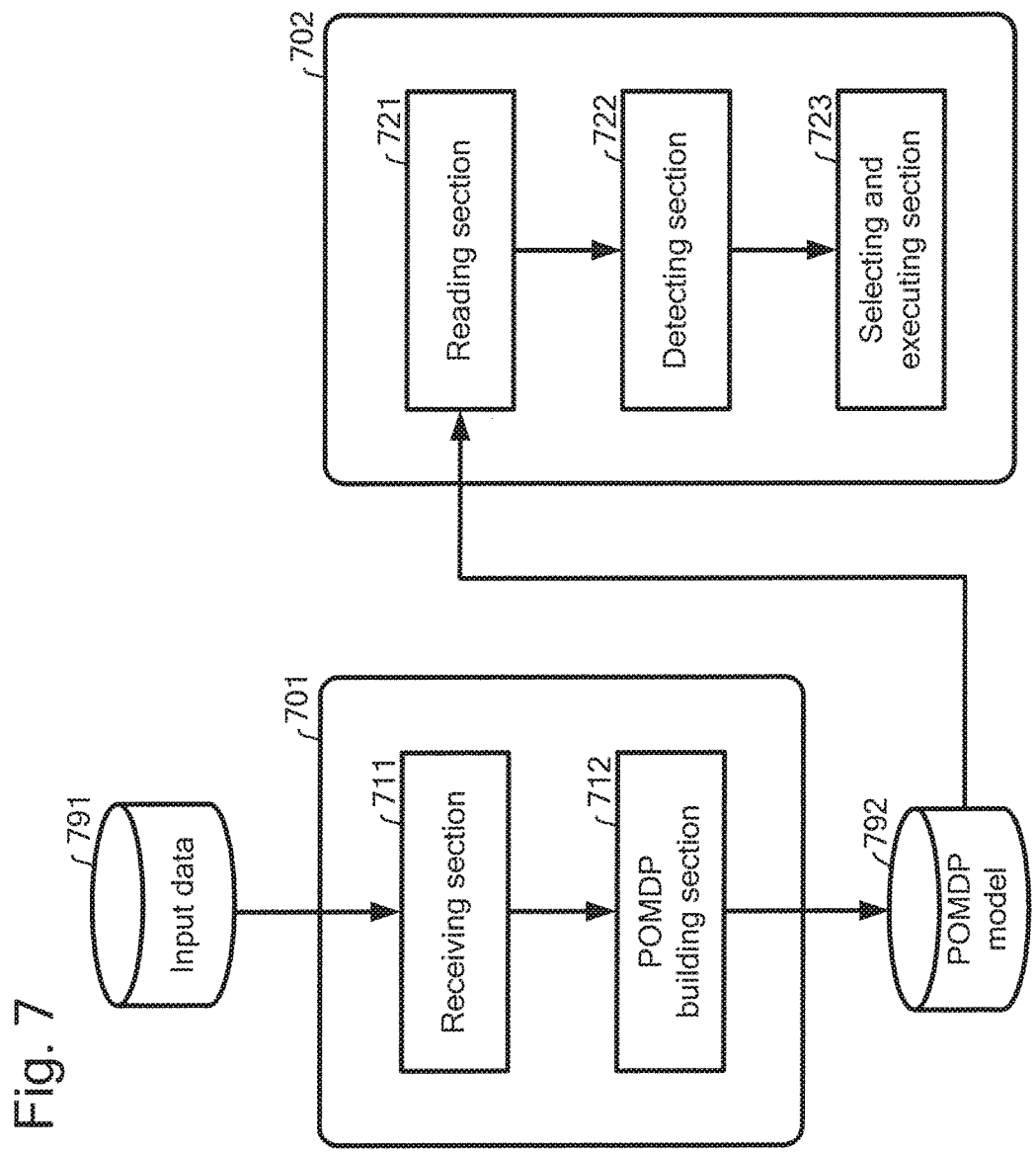
FIG. 7 illustrates of an overall functional block/flow diagram of a system used in accordance with an embodiment described in FIGS. 2A, 2B and 3 or FIGS. 4A, 4B and 5 of the present invention.

FIG. 7 illustrates an embodiment of an overall functional block diagram of a system.

With reference now to FIG. 7, FIG. 7 illustrates an embodiment of an overall functional block diagram of a system used in accordance with an embodiment of the flowchart described in either FIGS. 2A, 2B and 3 or FIGS. 4A, 4B and 5.

A system (701) may be used for building a POMDP model. A system (702) may be used for selecting an action, using the POMDP model which was built by the system (701). The system (701) may be the same or different from the system (702).

The system (701) includes a receiving section (711) and a POMDP building section (712).

The receiving section (711) reads or receives, into a memory, stochastic probability data as input data from a storage (791) for building a POMDP model.

The receiving section (711) may perform step 202 described in FIG. 2A or step 402 described in FIG. 4A.

The POMDP building section (712) iteratively calculates, in a POMDP solver, alpha vectors maximizing expected long-term cumulative rewards in each time-step.

The POMDP building section (712) further selects top-k action IDs which maximize expected long-term cumulative rewards in each time-step. The top-k action IDs may be top-k alpha vectors, each of the top-k alpha vectors having an associated action; or identifiers of top-k actions associated with the set of alpha vectors, where k is an integer of two or more. Accordingly, k may be, for example, 2, 3, 4, 5, or more.

In a case where the top-k action IDs are top-k alpha vectors, the POMDP building section (712) may select top-k alpha vectors among the calculated alpha vectors. This may be similar in that the system prunes alpha vectors other than the top-k alpha vectors.

In a case where the top-k action IDs are identifiers of top-k actions associated with the set of alpha vectors, the POMDP building section (712) selects top-k actions among a set of actions associated with the set of the calculated alpha vectors. This may be similar in that the system prunes alpha vectors other than the alpha vectors associated with the top-k actions.

The POMDP building section (712) continues the calculation of the alpha vectors until alpha vectors are converged.

The POMDP building section (712) stores the POMDP model into a storage (792).

The POMDP building section (712) may perform step 203 described in FIG. 2A and all steps described in FIG. 2B or step 403 described in FIG. 4A and all steps described in FIG. 4B.

The system (702) comprises a reading section (721), a detecting section (722) and a selecting and executing section (723).

The reading section (721) may read, into a memory, the POMDP model from the storage (792).

The reading section (721) may perform step 312 described in FIG. 3 or step 512 described in FIG. 5.

The detecting section (722) detects a situation where an action identified by the best action ID among the top-k action IDs for a current belief state is unable to be selected due to constraints in execution-time process of the POMDP model.

The detecting section (722) may perform steps 314, 318 and 319 described in FIG. 3 or steps 514, 518 and 519 described in FIG. 5.

The selecting and executing section (723) selects and executes an action identified by the second best action ID among the top-k action IDs for the current belief state in response to a detection of the above situation.

The selecting and executing section (723) may perform steps 313 and 315 to 317 described in FIG. 3 or steps 513 and 515 to 517 described in FIG. 5.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A system, comprising:
a processor; and
a memory storing a program, which, when executed on the processor, performs a method for selecting an action, the method comprising:
reading, into a memory, a Partially Observed Markov Decision Process (POMDP) model, the POMDP model having top-k action IDs for each of one or more belief states, the top-k action IDs maximizing expected long-term cumulative rewards in each time-step, and k being an integer of two or more determined by a number of alternative alpha vectors utilized in an execution time process of the POMDP model, based on a point-based value iteration algorithm, the alternative alpha vectors being calculated for each of the one or more belief states, wherein a user selects a predetermined number of vectors k to determine a set of first best alpha vectors identified by a first best action ID for each of the one or more belief states;

in the execution-time process of the POMDP model, detecting a situation where an action identified by the first best action ID among the top-k action IDs for a current belief state is unable to be selected due to any of a plurality of constraints, the constraints including execution- time process constraints of the POMDP model;

determining a set of top second (k=2) alpha vectors including a plurality of second best actions for each of the belief states, each of the second best actions from the set of top second (k=2) alpha vectors being identified by a second best action ID based on a displayed graph including the first best action ID and the second best action ID, and being generated by iteratively calculating the top second (k=2) alpha vectors until convergence, and pruning alpha vectors other than the top second (k=2) alpha vectors for each of the belief states, the second best actions identified by the second best action ID being different from the first best actions identified by the first best action ID for corresponding belief states; and selecting and executing only the second best action identified by the second best action ID among the top-k action IDs and the set of top second (k=2) alpha vectors for the current belief state in response to a detection of the situation.

2. The system according to claim 1, wherein the top-k action IDs are top-k alpha vectors and each of the top-k alpha vectors have an associated action.

3. The system according to claim 1, wherein the top-k action IDs are identifiers of top-k actions associated with alpha vectors.

4. The system according to claim 1, wherein when an action identified by the second best alpha vector for the corresponding belief state from among the set of the fist best alpha vectors for each belief state is the same as that identified by the best alpha vector for the corresponding belief state among the set of the first best alpha vectors for each belief state, a different action cannot be selected due to the constraints in the execution-time process constraints of the POMDP model.

5. A computer program product for selecting an action, the computer program product comprising a non-transitory computer readable storage medium having program instructions embodied therewith, wherein the computer readable storage medium is not a transitory signal per se, the program instructions executable by a computer to cause the computer to perform a method comprising:

reading, into a memory, a Partially Observed Markov Decision Process (POMDP) model, the POMDP model having top-k action IDs for each of one or more belief states, the top-k action IDs maximizing expected long-term cumulative rewards in each time-step, and k being an integer of two or more determined by a number of alternative alpha vectors utilized in an execution time process of the POMDP model, based on a point-based value iteration algorithm, the alternative alpha vectors being calculated for each of the one or more belief states, wherein a user selects a predetermined number of vectors k to determine a set of first best alpha vectors identified by a first best action ID for each of the one or more belief states;

in the execution-time process of the POMDP model, detecting a situation where an action identified by the first best action ID among the top-k action IDs for a current belief state is unable to be selected due to any of a plurality of constraints, the constraints including execution- time process constraints of the POMDP model;

determining a set of top second (k=2) alpha vectors including a plurality of second best actions for each of the belief states, each of the second best actions from the set of top second (k=2) alpha vectors being identified by a second best action ID based on a displayed graph including the first best action ID and the second best action ID, and being generated by iteratively calculating the top second (k=2) alpha vectors until convergence, and pruning alpha vectors other than the top second (k=2) alpha vectors for each of the belief states, the second best actions identified by the second best action ID being different from the first best actions identified by the first best action ID for corresponding belief states; and selecting and executing only the second best action identified by the second best action ID among the top-k action IDs and the set of top second (k=2) alpha vectors for the current belief state in response to a detection of the situation.

6. The computer program product according to claim 5, wherein the top-k action IDs are top-k alpha vectors and each of the top-k alpha vectors have an associated action.

7. The computer program product according to claim 5, wherein the top-k action IDs are identifiers of top-k actions associated with alpha vectors.

8. The computer program product according to claim 6, wherein alpha vectors other than the top-k alpha vectors are pruned when the top-k alpha vectors are selected.

9. The computer program product according to claim 7, wherein alpha vectors other than the alpha vectors associated with the top-k action IDs are pruned when the top-k actions are selected.

10. The computer program product according to claim 5, wherein when an action identified by the second best alpha vector for the corresponding belief state from among the set of the fist best alpha vectors for each belief state is the same as that identified by the best alpha vector for the corresponding belief state among the set of the first best alpha vectors for each belief state, a different action cannot be selected due to the constraints in the execution-time process constraints of the POMDP model.

11. A computer-implemented method for selecting an action, comprising:

reading, into a non-transitory computer-readable storage medium, a Partially Observed Markov Decision Process (POMDP) model, the POMDP model having top-k action IDs for each of one or more belief states, the top-k action IDs maximizing expected long-term cumulative rewards in each time-step, and k being an integer of two or more determined by a number of alternative alpha vectors utilized in an execution time process of the POMDP model, based on a point-based value iteration algorithm, the alternative alpha vectors being calculated for each of the one or more belief states, wherein a user selects a predetermined number of vectors k to determine a set of first best alpha vectors identified by a first best action ID for each of the one or more belief states;

in the execution-time process of the POMDP model, detecting a situation where an action identified by the first best action ID among the top-k action IDs for a current belief state is unable to be selected due to any of a plurality of constraints, the constraints including execution-time process constraints of the POMDP model;

determining a set of top second (k=2) alpha vectors including a plurality of second best actions for each of the belief states, each of the second best actions from the set of top second (k=2) alpha vectors being identified by a second best action ID based on a displayed graph including the first best action ID and the second best action ID, and being generated by iteratively calculating the top second (k=2) alpha vectors until convergence, and pruning alpha vectors other than the top second (k=2) alpha vectors for each of the belief states, the second best actions identified by the second best action ID being different from the first best actions identified by the first best action ID for corresponding belief states; and selecting and executing only the second best action identified by the second best action ID among the top-k action IDs and the set of top second (k=2) alpha vectors for the current belief state in response to a detection of the situation.

12. The computer-implemented method according to claim 11, wherein when an action identified by the second best alpha vector for the corresponding belief state from among the set of the fist best alpha vectors for each belief state is the same as that identified by the best alpha vector for the corresponding belief state among the set of the first best alpha vectors for each belief state, a different action cannot be selected due to the constraints in the execution-time process constraints of the POMDP model.

* * * * *